(12) United States Patent
Fuki et al.

(10) Patent No.: US 10,890,122 B2
(45) Date of Patent: Jan. 12, 2021

(54) METHOD AND DEVICE FOR CONTROLLING STARTING OF ENGINE

(71) Applicant: Mazda Motor Corporation, Hiroshima (JP)

(72) Inventors: Kanae Fuki, Otake (JP); Kotaro Takahashi, Hiroshima (JP); Toru Kobayashi, Hiroshima (JP); Hiromu Sugano, Higashihiroshima (JP); Masahiro Tateishi, Hatsukaichi (JP); Ryohei Karatsu, Hiroshima (JP); Takamitsu Miyahigashi, Kure (JP); Jiro Yamasaki, Higashihiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 111 days.

(21) Appl. No.: 16/344,540

(22) PCT Filed: Nov. 30, 2016

(86) PCT No.: PCT/JP2016/085639
§ 371 (c)(1),
(2) Date: Apr. 24, 2019

(87) PCT Pub. No.: WO2018/100698
PCT Pub. Date: Jun. 7, 2018

(65) Prior Publication Data
US 2019/0293005 A1    Sep. 26, 2019

(51) Int. Cl.
*F02D 41/08* (2006.01)
*F02D 29/02* (2006.01)
(Continued)

(52) U.S. Cl.
CPC .......... *F02D 29/02* (2013.01); *F02D 41/062* (2013.01); *F02D 41/40* (2013.01); *F02N 11/00* (2013.01);
(Continued)

(58) Field of Classification Search
CPC ........ F02D 41/062; F02D 41/08; F02D 41/16; F02D 41/40; F02D 2200/101;
(Continued)

(56) References Cited

U.S. PATENT DOCUMENTS

| | | | | |
|---|---|---|---|---|
| 5,564,387 A | * | 10/1996 | Igarashi | F02D 31/005 123/339.23 |
| 2004/0144165 A1 | * | 7/2004 | Yamada | G01M 15/11 73/114.06 |

(Continued)

FOREIGN PATENT DOCUMENTS

| DE | 102008036339 A1 | 2/2010 |
|---|---|---|
| DE | 102013224890 A1 | 6/2015 |

(Continued)

OTHER PUBLICATIONS

European Patent Office, Extended European Search Report Issued in Application No. 18213940.2, dated Jun. 11, 2019, Germany, 88 pages.

*Primary Examiner* — Thomas N Moulis
(74) *Attorney, Agent, or Firm* — Alleman Hall Creasman & Tuttle LLP

(57) ABSTRACT

At start of an engine, a fuel injection amount is set to a jump-over injection amount if the engine speed obtained in each cycle is higher than or equal to a determination threshold value, which is set lower than a lower limit of a resonance speed range of powertrain by a predetermined reference value. If the engine speed is lower than the value, the fuel injection amount is set to a step-over injection (Continued)

amount that is smaller than the jump-over injection amount. This setting makes it possible to increase the engine speed such that the engine speed approaches the lower limit of the resonance speed range causing resonance in the powertrain, up to a predetermined range, and then causes the engine speed to jump straight to an engine speed which exceeds the resonance speed range, while in the process of increasing the engine speed by executing the combustion cycles.

12 Claims, 10 Drawing Sheets

(51) Int. Cl.
  *F02D 41/06* (2006.01)
  *F02N 11/00* (2006.01)
  *F02D 41/40* (2006.01)
  *F02P 5/15* (2006.01)
(52) U.S. Cl.
  CPC .............. *F02D 2200/101* (2013.01); *F02D 2200/1002* (2013.01); *F02D 2200/50* (2013.01); *F02D 2250/18* (2013.01); *F02D 2250/28* (2013.01); *F02P 5/15* (2013.01); *Y02T 10/40* (2013.01)
(58) Field of Classification Search
  CPC ......... F02D 2200/1012; F02D 2200/50; F02D 2250/18; F02D 2250/28
  See application file for complete search history.

(56) References Cited

U.S. PATENT DOCUMENTS

| | | | | |
|---|---|---|---|---|
| 2009/0120174 | A1* | 5/2009 | Nodera | G01M 15/11 73/114.04 |
| 2009/0171538 | A1* | 7/2009 | Kadota | B60K 6/485 701/51 |
| 2012/0253633 | A1* | 10/2012 | Anzawa | F02D 17/04 701/102 |
| 2016/0023648 | A1* | 1/2016 | Yamamoto | F16H 3/727 701/22 |
| 2019/0162255 | A1* | 5/2019 | Hoche | F16D 48/08 |
| 2019/0219111 | A1* | 7/2019 | Hoche | F16D 48/08 |
| 2019/0242352 | A1* | 8/2019 | Hoshino | F02D 43/00 |
| 2019/0293005 | A1 | 9/2019 | Fuki et al. | |
| 2020/0072135 | A1* | 3/2020 | Hotta | F02D 13/0257 |
| 2020/0208600 | A1* | 7/2020 | Hoess | B60K 17/02 |

FOREIGN PATENT DOCUMENTS

| | | |
|---|---|---|
| EP | 1099616 A2 | 5/2001 |
| EP | 1505287 A2 | 2/2005 |
| EP | 2716898 A1 | 4/2014 |
| JP | S5367214 U | 6/1978 |
| JP | S57201777 A | 12/1982 |
| JP | 2006063833 A | 3/2006 |
| JP | 2006315510 A | 11/2006 |
| JP | 2009035121 A | 2/2009 |
| JP | 2009228538 A | 10/2009 |
| JP | 2012007487 A | 1/2010 |
| JP | 2010203423 A | 9/2010 |
| JP | 2011047348 A | 3/2011 |
| JP | 2011230521 A | 11/2011 |
| JP | 2012167627 A | 9/2012 |
| JP | 2013194584 A | 9/2013 |
| JP | 2015074285 A | 4/2015 |
| JP | 2015113774 A | 6/2015 |
| JP | 2017052456 A | 3/2017 |

* cited by examiner

METHOD AND DEVICE FOR CONTROLLING STARTING OF ENGINE

TECHNICAL FIELD

The technique disclosed herein relates to a method of and a system for controlling start of an engine.

BACKGROUND ART

An engine is integrated with a power transmission mechanism such as a transmission to form a powertrain unit called "powertrain," which is mounted in a vehicle body via an engine mount having elastic force. While the engine operates, the movement of the engine generates vibrations of the powertrain. If the frequency of these vibrations is equal to the resonance frequency (i.e. the natural frequency) of the powertrain, resonance occurs. Then, the vibrations generated in the powertrain are not damped enough by the engine mount, and thereby increasing the vibrations transmitted to the vehicle and the accompanying noise. This makes the occupant(s) uncomfortable.

The frequency of the vibrations generated in a powertrain by driving of an engine corresponds to the engine speed. Resonance occurs in the powertrain while the vehicle travels in a condition in which a speed range at and around an engine speed causing resonance in the powertrain (hereinafter referred to as a "resonance speed range") is set higher than or equal to an engine speed while an engine performs a no-load operation, what is called an "idle operation," in which no driving power is transmitted to driving wheels (tires) after the start of the engine (hereinafter referred to as an "idle speed"). For this reason, the powertrain is usually designed so that the resonance speed range falls within a speed range lower than the idle speed.

If, in this manner, the resonance speed range causing resonance in the powertrain is set to the engine speed range lower than the idle speed, the above-described resonance in the powertrain may generate vibrations in the vehicle at the start period of the engine, which is from when the engine starts cranking until when execution of combustion cycles allows the engine speed to reach the idle speed. To address the problem, techniques of reducing vibrations of a vehicle at start of an engine have been suggested.

For example, Patent Document 1 discloses an engine control system (an ignition timing control system) that performs ignition at unique timing at start of the engine. This control system is configured to advance the ignition timing in a period immediately after the start of the engine until the engine speed passes through the resonance speed range (or a vehicle resonance band), compared with the ignition timing in the idle operation. According to this configuration, the engine torque increases by the advance of the ignition timing. This accelerates the engine speed at a higher rate and allows the operating state of the engine to rapidly pass through the resonance speed range.

CITATION LIST

Patent Document

Patent Document 1: Japanese Unexamined Patent Publication No. 2015-113774

SUMMARY OF THE INVENTION

Technical Problem

As in the engine control system disclosed in Patent Document 1, an increase in the engine torque at the start of the engine allows the operating state of the engine to rapidly pass through the resonance speed range. However, while the engine speed increases, the engine speed achieved by combustion in each combustion cycle may fall within the resonance speed range causing resonance in the powertrain. Vibrations are inevitably generated in the powertrain by resonance. If the resonance in the powertrain causes vibrations of the vehicle even for a short time, the occupant(s) of the vehicle feel(s) uncomfortable.

Particularly, a compression ignition engine including a diesel engine has a compression ratio higher than a general spark ignition engine. The torque therefore varies relatively largely at combustion in each combustion cycle, which causes relatively large vibrations in the engine. If the engine speed achieved by combustion in each combustion cycle falls within the resonance speed range causing resonance in the powertrain, the vibrations caused by the resonance in the powertrain and the vibrations caused by the torque variations at that time together increase the vibrations generated in the powertrain. As a result, significant vibrations are generated in the vehicle.

The technique disclosed herein is therefore intended to reduce vibrations generated in a powertrain unit including an engine at start of the engine.

Solution to the Problem

In order to achieve the above objective, the technique disclosed herein increases the engine speed such that the engine speed approaches the lower limit of a resonance speed range causing resonance in a powertrain unit, up to a predetermined range, and then causes the engine speed to jump straight to an engine speed which exceeds the resonance speed range, while in a process of increasing the engine speed by executing combustion cycles.

Specifically, the technique disclosed herein is directed to a method of controlling start of an engine from when cranking is started by driving a starter motor until when an engine speed reaches a predetermined idle speed by execution of combustion cycles. The method of controlling start of the engine includes a step of obtaining the engine speed in each cycle, and a step of setting a torque based on the engine speed obtained in the step of obtaining the engine speed.

In the step of setting the torque, a first torque is set as the torque, if a difference between a lower limit of a preset resonance speed range including an engine speed corresponding to a resonance frequency of a powertrain unit including the engine and the engine speed obtained in the step of obtaining the engine speed is smaller than a predetermined reference value, and a second torque smaller than the first torque is set as the torque, if the difference is larger than or equal to the reference value.

In this method of controlling start of the engine, the combustion cycles are executed after cranking has been started by driving the starter motor. Once the combustion cycles start, the engine speed is obtained in each cycle in the step of obtaining the engine speed. Then, in the step of setting the torque, a torque is set as a targeted control variable based on the engine speed obtained in the step of obtaining the engine speed. At the start of the engine, a rate of increase in the engine speed varies depending on the magnitude of the torque set in the above manner. The larger the torque is, the more the engine speed increases, while the smaller the torque is, the less the engine speed increases.

In the step of setting the torque, if the difference between the engine speed obtained in the step of obtaining the engine speed and the lower limit of the resonance speed range is larger than or equal to the predetermined reference value, the engine speed is lower than, and is relatively far from, the lower limit of the resonance speed range. The engine torque is thus set to the second torque that is relatively small. Since the second torque is smaller than the first torque, the rate of increase in the engine speed is small. The engine speed can thus approach the lower limit of the resonance speed range before the engine speed exceeds the resonance speed range.

On the other hand, in the step of setting the torque, if the difference between the engine speed obtained in the step of obtaining the engine speed and the lower limit of the resonance speed range is smaller than the reference value, the engine speed is relatively close to the lower limit of the resonance speed range. The engine torque is thus set to the first torque that is relatively large. Since the first torque is larger than the second torque, the engine speed can be increased more significantly from the engine speed close to the lower limit of the resonance speed range.

In this manner, the method of controlling start of the engine makes it possible to increase the engine speed such that the engine speed approaches the lower limit of the resonance speed range, up to a predetermined range, and then increase the engine speed significantly, while in the process of increasing the engine speed by executing the combustion cycles. This reduces the possibility that the engine speed achieved by the combustion in each combustion cycle falls within the resonance speed range. The resonance, which may occur in the powertrain unit including the engine at the start of the engine, can be thus reduced.

In the step of setting the torque, if the difference is larger than or equal to the reference value, the torque may be set so that the engine speed achievable by combustion in one of the combustion cycles, the engine speed of which combustion cycle has been obtained to have the difference, is lower than the lower limit of the resonance speed range, and so that the difference becomes smaller than the reference value.

In such a method of controlling start of the engine, if the engine speed after start of the combustion cycles is lower than and relatively far from the lower limit of the resonance speed range, the torque is set such that the engine speed approaches the lower limit of the resonance speed range, up to a predetermined range in which the engine torque is set to the first torque. As a result, the engine speed which has been relatively far from the lower limit of the resonance speed range can efficiently approach the lower limit in a smaller number of combustion cycles. This is thus advantages in rapid ending of the start of the engine.

The engine may be a 4-cylinder, 4-cycle engine. In this case, in the step of obtaining the engine speed, a rotation speed of a crankshaft may be detected when a cylinder executing an n-th combustion cycle is in a first half of a compression stroke of the combustion cycle, where n is a positive integer, and the engine speed achieved by combustion in an (n−1)-th combustion cycle may be obtained based on the rotation speed.

The "first half of a compression stroke" used herein corresponds to the first half of a compression stroke when the compression stroke is divided into the first and second halves. Note that the number of the "combustion cycles" used herein is not counted up independently for each cylinder, but is counted up for all the four cylinders together. Specifically, in a 4-cylinder, 4-cycle engine, the number of combustion cycles is incremented by one every time the crankshaft turns 180 degrees.

In a conceivable method of obtaining the engine speed, the engine speed may be detected based on, for example, the time required by the crankshaft to turn 180 degrees of one rotation (360 degrees), that is, the speed of a half rotation of the crankshaft. Such a method of obtaining the engine speed is advantageous in securing high accuracy in detecting the engine speed in a normal operating state, in which the engine operates at a speed higher than or equal to the idle speed, because rotation speed of the crankshaft at this moment is higher than at the start of the engine.

However, at the start of the engine, variations in the engine speed due to combustion of each combustion cycle are relatively large, compared to the time when the engine operates at a speed higher than the idle speed, because there is a great influence of the inertia of the flywheel. Thus, if the time required by the crankshaft to turn 180 degrees (i.e., a half rotation) is used to obtain the engine speed, the accuracy in detecting the engine speed rather deteriorates. For this reason, the method of obtaining the engine speed based on the speed of the half rotation of the crankshaft is not suitable as a method of obtaining the engine speed achieved by the combustion in the previous (n−1)-th combustion cycle, before the setting of the fuel injection amount in the n-th combustion cycle at the start of the engine.

By contrast, the method according to the technique disclosed herein detects the engine speed achieved by the combustion in the (n−1)-th combustion cycle based on the rotation speed of the crankshaft in the first half of the compression stroke in the n-th combustion cycle.

In a 4-cylinder, 4-cycle engine, when combustion is performed in the (n−1)-th combustion cycle, that is, when the cylinder executing this combustion cycle is in an expansion stroke, the cylinder executing the n-th combustion cycle is in a compression stroke. Thus, the engine speed achievable by the combustion in the (n−1)-th combustion cycle can be obtained by obtaining the rotation speed of the crankshaft when the cylinder executing the n-th combustion cycle is in the compression stroke. In particular, by obtaining the engine speed in the first half of the compression stroke, the information of the engine speed achieved by the combustion in the (n 1)-th combustion cycle can be reflected in the setting of the torque in the n-th combustion cycle, and further in a control operation of the manipulation according to the torque.

The engine may be a compression ignition engine which includes an injector configured to inject fuel to be fed into a combustion chamber, and which ignites the fuel fed into the combustion chamber by a compression operation of a piston, In this case, the step of setting the torque may be a step of setting an amount of fuel to be injected by the injector in accordance with the difference. In the step of setting the amount of fuel, a first predetermined injection amount may be set as the amount of fuel to be injected, if the difference is smaller than the reference value, and a second injection amount smaller than the first injection amount may be set as the amount of fuel to be injected, if the difference is larger than or equal to the reference value.

The "compression ignition engine" used herein includes a diesel engine and a compression ignition gasoline engine. The "combustion chamber" used herein is not limited to a space defined when the piston reaches a compression top dead center. The term "combustion chamber" is used in a broad sense.

In a compression ignition engine, the torque varies depending on the amount of fuel fed into the combustion chamber. The more fuel is injected, the larger torque of the engine is obtained, while the less fuel is injected, the smaller torque of the engine is obtained. Thus, setting, in the step of setting the amount of fuel, the amount of fuel to be injected in accordance with the difference between the engine speed and the lower limit of the resonance speed range allows the engine to obtain a torque corresponding to the amount of fuel to be injected. Specifically, if the first injection amount is set as the amount of fuel to be injected, the engine obtains the first torque, which is relatively large, as a torque corresponding to the first injection amount. On the other hand, if the second injection amount is set as the amount of fuel to be injected, the engine obtains the second torque, which is relatively small, as a torque corresponding to the second injection amount.

In the method of controlling start of the engine, an amount of intake air to be introduced into the combustion chamber, and a temperature inside the combustion chamber may be obtained. In this case, in the step of setting the amount of fuel, if the difference is smaller than the reference value, the first injection amount may be set to allow the engine to output a maximum torque corresponding to the amount of intake air to be introduced to the combustion chamber and the temperature inside the combustion chamber.

The torque of an engine can be obtained by burning fuel in the air. The amount of intake air to be introduced into the combustion chamber, together with the amount of fuel to be injected by the injector, is a factor changing the combustion pressure, thereby influencing the torque obtained in the engine. The temperature inside the combustion chamber influences the volatility of a fuel (how easily the fuel evaporates), and is thus also a factor changing the combustion pressure, thereby influencing the torque obtained in the engine. Therefore, the maximum torque that can be output by the engine is determined mainly depending on the amount of intake air introduced into the combustion chamber and the temperature inside the combustion chamber.

In the step of setting the amount of fuel, if the difference between the engine speed and the lower limit of the resonance speed range is smaller than the predetermined reference value, that is, if the engine speed is relatively close to the lower limit of the resonance speed range, the first injection amount is set such that the engine outputs the maximum torque. As a result, the engine speed suddenly increases due to the maximum torque obtained by the comparison according to the first injection amount. This allows the engine speed achieved by the combustion at this moment to jump over the resonance speed range and fall out of the resonance speed range.

In the step of setting the amount of fuel, if the difference is smaller than the reference value, the first injection amount may be set such that the engine speed increases at a maximum rate by combustion of the combustion cycles in a start period from start of the combustion cycles until the engine speed reaches the idle speed.

In the step of setting the amount of fuel, if the difference between the engine speed and the lower limit of the resonance speed range is smaller than the reference value, that is, if the engine speed is relatively close to the lower limit of the resonance speed range, the first injection amount is set such that the engine speed increases at a maximum rate in the start period. As a result, the engine speed increases as significantly as possible due to the torque obtained by the comparison according to the first injection amount. This allows the engine speed achieved by the combustion at this moment to jump over the resonance speed range and fall out of the resonance speed range.

The technique disclosed herein is also directed to a system of controlling start of an engine from when cranking is started by driving a starter motor until when an engine speed reaches a predetermined idle speed by execution of combustion cycles. The system for controlling start of the engine includes: a starter motor which rotates a crankshaft provided in the engine; an injector attached to the engine, and configured to inject fuel to be fed into a combustion chamber; a controller connected to each of the starter motor and the injector, and configured to output a control signal to each of the starter motor and the injector to operate the engine; and an engine speed sensor connected to the controller, and configured to detect an engine speed and output a detection signal to the controller.

The controller includes: a speed obtaining section which obtains the engine speed in each cycle based on the detection signal of the engine speed sensor; and a fuel amount setting section which sets, based on the engine speed obtained by the speed obtaining section, an amount of fuel to be injected by the injector. the fuel amount setting section sets, in a start period of the engine from when cranking is started by driving the starter motor until when the engine speed reaches an idle speed by execution of the combustion cycles, a first injection amount as the amount of fuel to be injected, if a difference between a lower limit of a preset resonance speed range including an engine speed corresponding to a resonance frequency of a powertrain unit including the engine and the engine speed obtained by the speed obtaining section is smaller than a predetermined reference value, and a second injection amount, which is smaller than the first injection amount, as the amount of fuel to be injected, if the difference is larger than or equal to the reference value.

In this system for controlling start of the engine, the combustion cycles are executed after cranking has been started by driving the starter motor. Once the combustion cycles start, the speed obtaining section obtains the engine speed in each cycle. The fuel amount setting section sets, based on the engine speed obtained by the speed obtaining section, the amount of fuel to be injected by the injector. The engine torque is determined depending on the amount of fuel set at this moment, and the rate of increase in the engine speed varies. The larger the fuel injection amount is, the more the engine speed increases, while the smaller the fuel injection amount is, the less the engine speed increases.

If the difference between the engine speed obtained by the speed obtaining section and the lower limit of the resonance speed range is larger than or equal to the reference value, the engine speed is lower than and relatively far from the lower limit of the resonance speed range. The fuel injection amount is therefore set to the second injection amount that is relatively small. Since the second injection amount is smaller than the first injection amount, this setting reduces the torque, and eventually the rate of increase in the engine speed. The engine speed can thus approach the lower limit of the resonance speed range before the engine speed exceeds the resonance speed range.

On the other hand, if the difference between the engine speed obtained by the speed obtaining section and the lower limit of the resonance speed range is smaller than the reference value, the engine speed is relatively close to the lower limit of the resonance speed range. Thus, the fuel injection amount is set to the first injection amount that is relatively large. Since the first injection amount is larger than the second injection amount, this setting increases the torque, and eventually the rate of increase in the engine speed.

In this manner, the system for controlling start of the engine makes it possible to increase the engine speed such that the engine speed approaches the lower limit of the resonance speed range, and then significantly increase the engine speed, while in the process of increasing the engine speed by executing the combustion cycles. This reduces the possibility that the engine speed achieved by the combustion in each combustion cycle falls within the resonance speed range. The resonance, which may occur in the powertrain unit including the engine at the start of the engine, can be thus reduced.

If the difference is larger than or equal to the reference value, the fuel amount setting section sets the second injection amount so that the engine speed achievable by combustion in one of the combustion cycles, the engine speed of which combustion cycle has been obtained to have the difference, is lower than the lower limit of the resonance speed range, and so that the difference becomes smaller than the reference value.

In this system for controlling start of the engine, if the engine speed after start of the combustion cycles is lower than and relatively far from the lower limit of the resonance speed range, the second injection amount is set such that the engine speed approaches the lower limit of the resonance speed range, up to a predetermined range in which the amount of fuel to be injected is set to the first injection amount. As a result, the engine speed which has been relatively far from the lower limit of the resonance speed range can efficiently approach the lower limit in a smaller number of combustion cycles. This is thus advantages in rapid ending of the start of the engine.

The engine may be a 4-cylinder, 4-cycle engine. In this case, the speed obtaining section may detect a rotation speed of a crankshaft when a cylinder executing an n-th combustion cycle is in a first half of a compression stroke of the combustion cycle, and may obtain the engine speed achieved by combustion in an (n−1)-th combustion cycle based on the rotation speed of the crankshaft, where n is a positive integer.

The "first half of a compression stroke" used herein corresponds to the first half of a compression stroke when the compression stroke is divided into the first and second halves. Note that the number of the "combustion cycles" used herein is not counted up independently for each cylinder, but is counted up for all the four cylinders together. Specifically, in a 4-cylinder, 4-cycle engine, the number of combustion cycles is incremented by one every time the crankshaft turns 180 degrees.

In a 4-cylinder, 4-cycle engine, when combustion is performed in the (n−1)-th combustion cycle, that is, when the cylinder executing the (n−1)-th combustion cycle is in an expansion stroke, the cylinder executing the n-th combustion cycle is in a compression stroke. Thus, the engine speed achievable by the combustion in the (n−1)-th combustion cycle can be obtained by detecting the rotation speed of the crankshaft when the cylinder executing the n-th combustion cycle is in the compression stroke. In particular, by obtaining the engine speed in the first half of the compression stroke, the information of the engine speed achieved by the combustion in the (n−1)-th combustion cycle can be reflected in the setting of the amount of fuel to be injected in the n-th combustion cycle, and further in a control operation of the fuel injection.

The engine may be a compression ignition engine which ignites fuel fed into the combustion chamber by a compression operation of a piston.

The "compression ignition engine" used herein includes a diesel engine and a compression ignition gasoline engine. The "combustion chamber" used herein is not limited to a space defined when the piston reaches a compression top dead center. The term "combustion chamber" is used in a broad sense.

A compression ignition engine including a diesel engine has a compression ratio higher than the compression ratio of a general spark ignition engine. Thus, the torque of such a compression ignition engine varies relatively significantly, which causes relatively significant vibrations in the engine at combustion in each combustion cycle. If the engine speed achieved by combustion in each combustion cycle falls within the resonance speed range causing resonance in the powertrain, the vibrations caused by the resonance in the powertrain and the vibrations caused by the torque variations at that time together increase the vibrations generated in the powertrain. The system for controlling start of the engine according to the technique disclosed herein can reduce the vibrations of the vehicle caused by the resonance in the powertrain, and is thus particularly suitable for such a compression ignition engine.

The system for controlling start of the engine may further include: an airflow sensor which detects a flow rate of intake air flowing through an intake passage provided in the engine; and a water temperature sensor which is attached to the engine, and detects a temperature of engine cooling water. In this case, the controller may obtain an amount of intake air to be introduced to the combustion chamber based on a detection signal of the airflow sensor, and may obtain a temperature inside the combustion chamber based on a detection signal of the water temperature sensor. If the difference is smaller than the reference value, the fuel amount setting section may set the first injection amount so as to allow the engine to output a maximum torque corresponding to the amount of intake air to be introduced to the combustion chamber and the temperature inside the combustion chamber.

If the difference between the engine speed and the lower limit of the resonance speed range is smaller than the reference value, that is, if the engine speed is relatively close to the lower limit of the resonance speed range, the first injection amount is set such that the engine outputs the maximum torque. As a result, the engine speed increases at a maximum rate due to the maximum torque obtained by combustion in accordance with the first injection amount. This allows the engine speed achieved by the combustion at this moment to jump over the resonance speed range and fall out of the resonance speed range.

If the difference is smaller than the reference value, the fuel amount setting section may set the first injection amount such that the engine speed increases at a maximum rate by combustion of the combustion cycles in a start period from start of the combustion cycles until the engine speed reaches the idle speed.

If the difference between the engine speed and the lower limit of the resonance speed range is smaller than the reference value, that is, if the engine speed is relatively close to the lower limit of the resonance speed range, the first injection amount is set such that the engine speed increases at a maximum rate in the start period. As a result, the engine speed increases as significantly as possible due to the torque obtained by the comparison according to the first injection amount. This allows the engine speed achieved by the combustion at this moment to jump over the resonance speed range and fall out of the resonance speed range.

Advantages of the Invention

The method of and the system for controlling start of an engine reduce vibrations generated in the powertrain unit including the engine at starting the engine. This results in an advantageous reduction in vibrations of the vehicle, which is caused by the vibrations of the powertrain unit, and accompanying noise.

DESCRIPTION OF EMBODIMENTS

An exemplary embodiment will now be described in detail with reference to the drawings. In the embodiment, the method of and the system for controlling start of an engine will be described using a compression ignition engine as an example.

Figure 1:
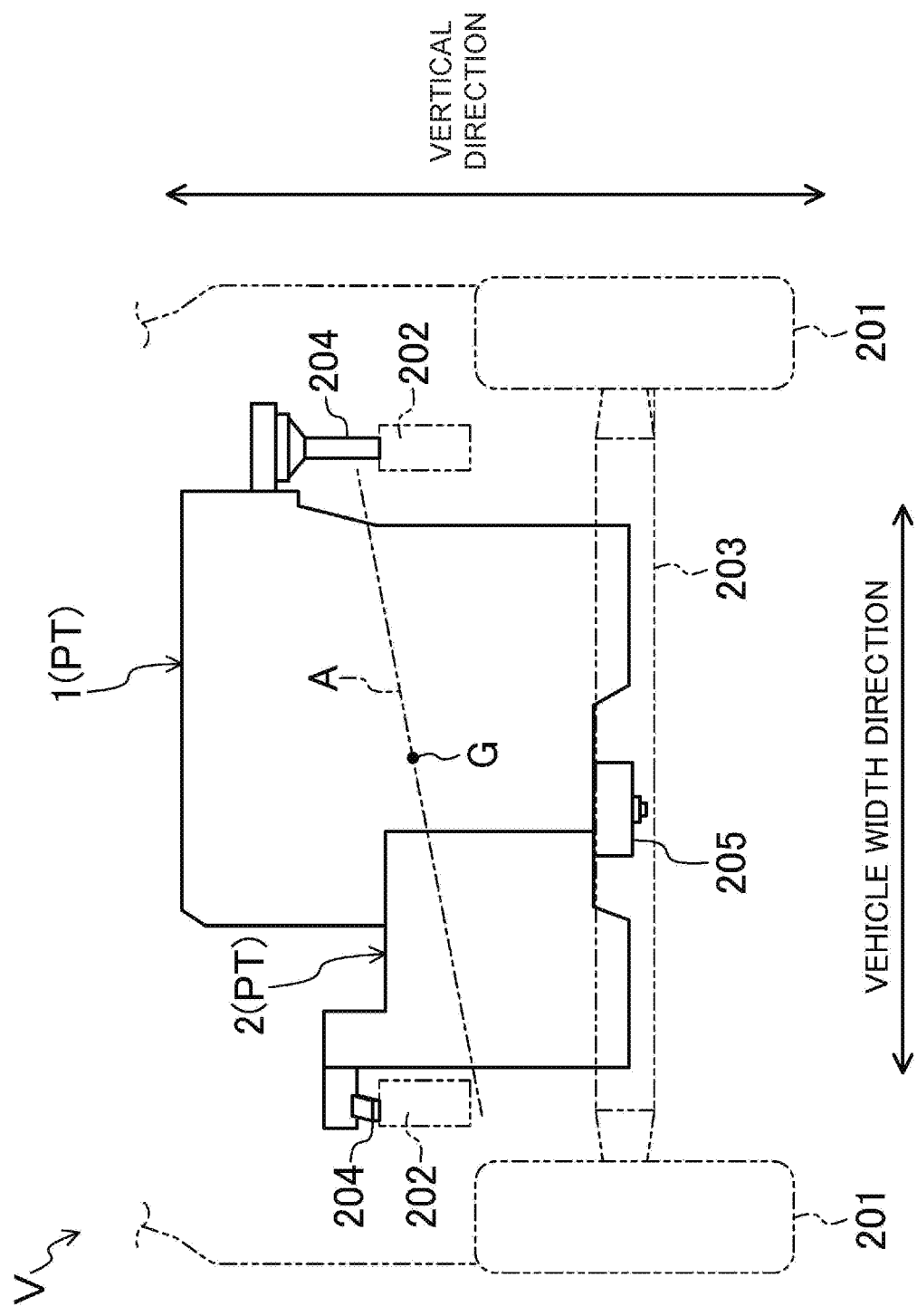
FIG. 1 is a diagram illustrating a rear view of a front part of a vehicle including a compression ignition engine.

FIG. 1 is a diagram illustrating a rear view of a front part of a vehicle V including a compression ignition engine 1. As shown in FIG. 1, the compression ignition engine (hereinafter simply referred to as an "engine") 1 according to this embodiment is mounted in a front-engine, front-drive, four-wheel vehicle (hereinafter referred to as a "vehicle") V. The engine 1 forms the powertrain PT of the vehicle V.

(Configuration of Powertrain)

The powertrain PT includes the engine 1 and a transmission 2. The powertrain PT changes, in the transmission 2, the speed of the output of the engine 1, and transmits the output having the changed speed to front wheels 201 of the vehicle V.

The vehicle body of the vehicle V includes a plurality of frames. For example, a pair of right and left front side frames 202 extending in the longitudinal direction of the vehicle V are disposed at both ends of the powertrain PT in the vehicle width direction. A subframe 203 is bridged below the front side frames 202 in the vehicle width direction.

The powertrain PT according to this embodiment employs a pendulum support structure. Specifically, the upper parts of both ends of the powertrain PT in the vehicle width direction (namely, parts of the powertrain PT located above the center of gravity G) are supported by the front side frames 202 via respective engine mounts 204. The engine mounts 204 have elastic force, and support and suspend both the ends of the powertrain PT.

In the case of employing the pendulum type, the powertrain PT vibrates so as to rotate about a roll axis A extending substantially in the vehicle width direction, using torque variations at the time, for example, when the engine 1 operates as vibration force. In order to reduce such vibrations, the lower part of the powertrain PT (namely, part of the powertrain PT located below the center of gravity G) is coupled to the subframe 203 via a torque rod 205.

Note that the resonance frequency at the time when the powertrain PT vibrates is determined depending on the hardware structure or the support structure of the powertrain PT. Although not described in detail, the resonance frequency according to this embodiment is adjusted so that the engine speed corresponding to the resonance frequency (hereinafter referred to as a "resonance speed") Rr is at least lower than an idle speed Ri of the engine 1. The idle speed Ri is set so as not to cause engine stall, for example, when the vehicle V does not travel and when the accelerator pedal is not depressed.

(General Configuration of Engine)

Figure 2:
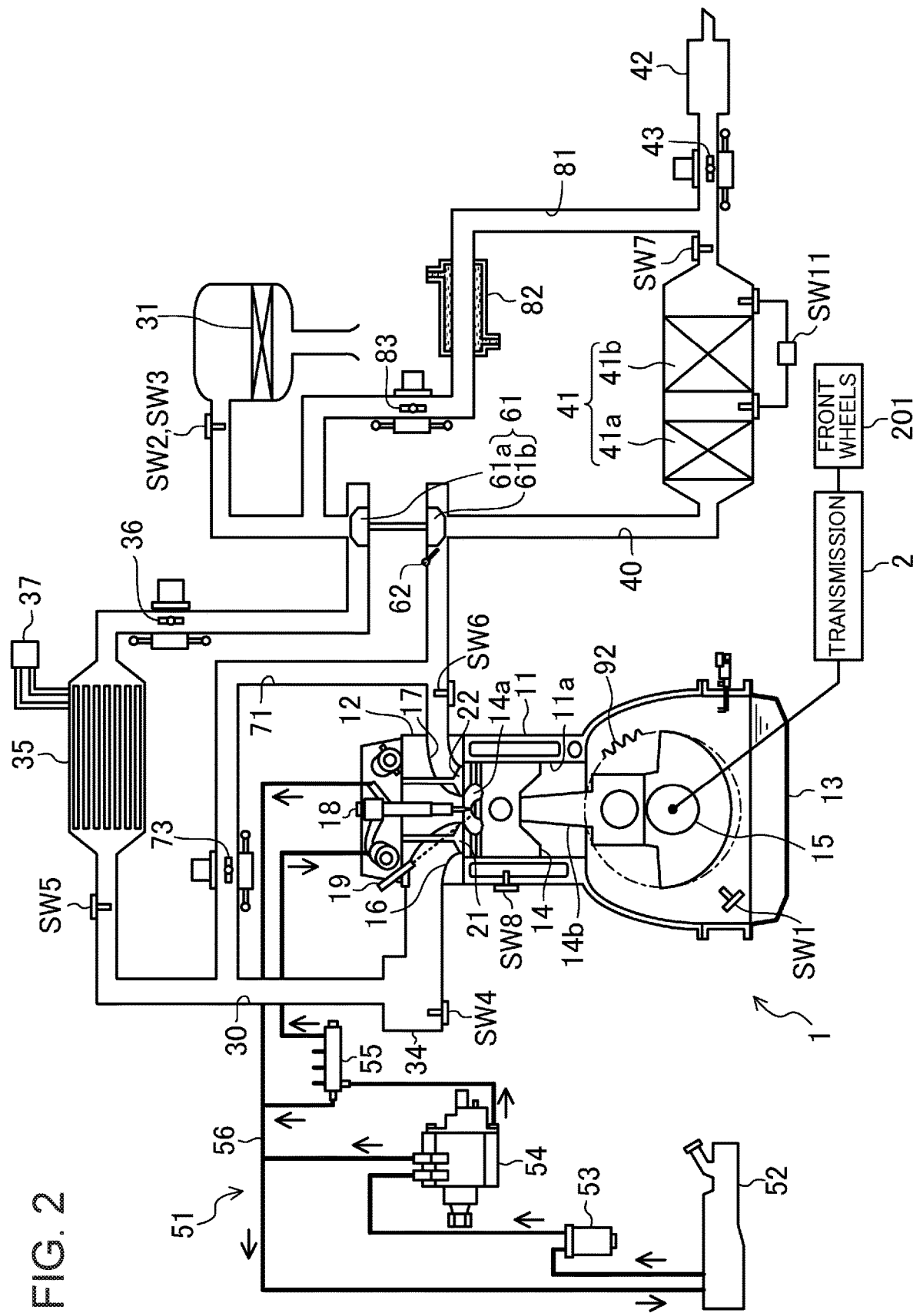
FIG. 2 is a diagram illustrating a configuration of the compression ignition engine.
Figure 3:
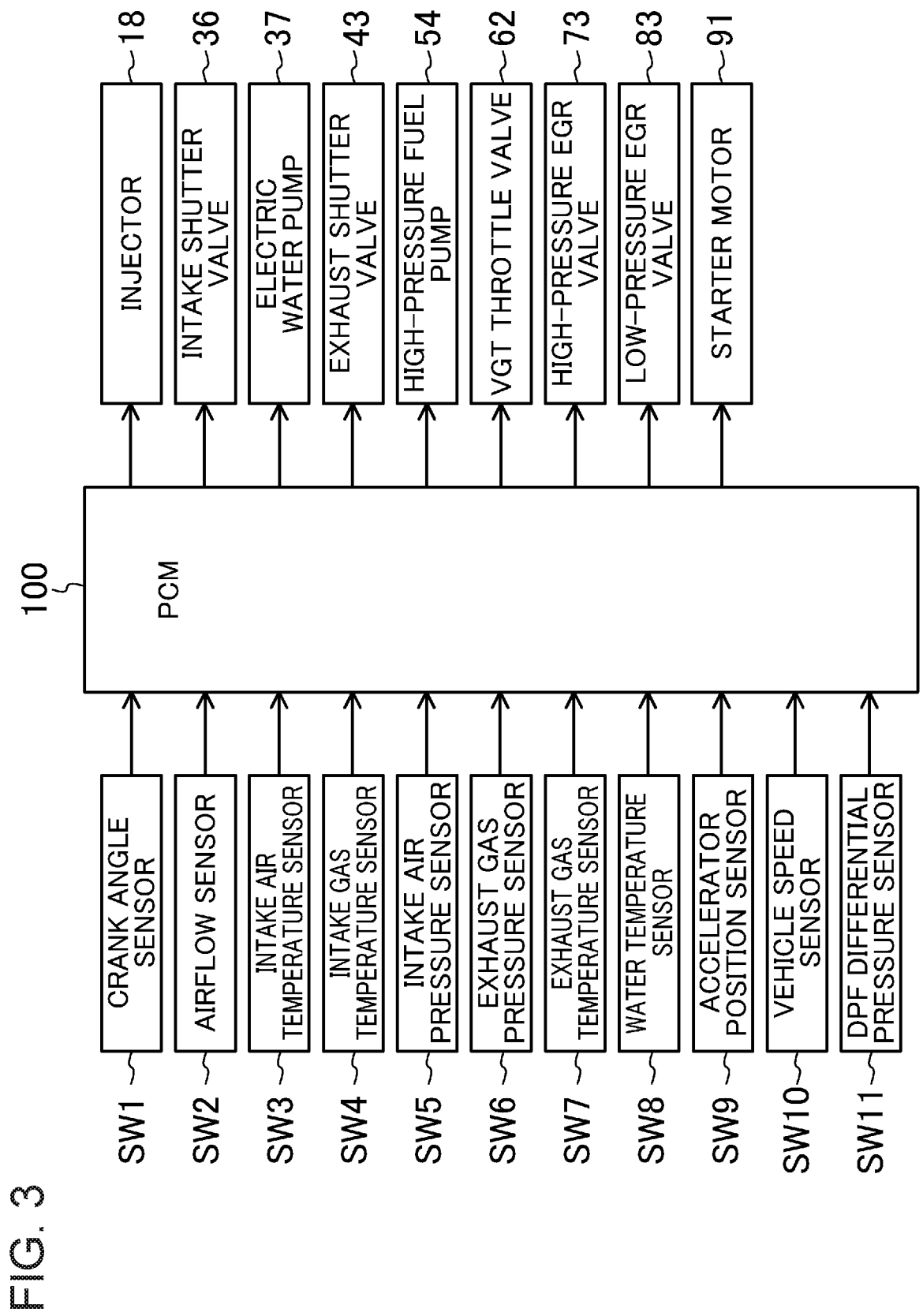
FIG. 3 is a diagram illustrating a block diagram associated with control of the compression ignition engine.

FIG. 2 illustrates a configuration of the engine 1. FIG. 3 is a block diagram associated with control of the engine 1. The engine 1 is an inline 4-cylinder, 4-cycle diesel engine configured to ignite fuel, fed into a combustion chamber, by compression operation of pistons. However, the engine 1 is not limited to a diesel engine. The technique disclosed herein is applicable to, for example, a compression ignition gasoline engine.

As shown in FIG. 2, the engine 1 includes a cylinder block 11 provided with four cylinders 11a (only one is shown), a cylinder head 12 located above the cylinder block 11, and an oil pan 13 located below the cylinder block 11 and storing lubricant. A piston 14 is slidably fitted into each of the cylinders 11a. The top surface of the piston 14 has a cavity defining a combustion chamber 14a.

The piston 14 is coupled to a crankshaft 15 via a connecting rod 14b. The crankshaft 15 is coupled to the transmission 2 described above. A trigger plate 92 is attached to the crankshaft 15. The trigger plate 92 rotates integrally with the crankshaft 15.

Note that the "combustion chamber" used herein is not limited to a space defined when the piston 14 reaches a compression top dead center. The term "combustion chamber" is used in a broad sense. That is, the "combustion chamber" may denote the space defined by the piston 14, the cylinder 11a, and the cylinder head 12, regardless of the position of the piston 14.

The geometric compression ratio of the engine 1 is set higher than that of a general spark ignition engine. Specifically, the geometric compression ratio of the engine 1 is set to 14 or higher. This setting is a mere example, and may be changed as appropriate.

The cylinder block 11 includes a starter motor 91 (shown only in FIG. 3) for starting cranking at start of the engine 1. The starter motor 91 detachably meshes with a ring gear (not shown), which is coupled to an end portion of the crankshaft 15. To start cranking at the start of the engine 1, the starter motor 91 is driven. The starter motor 91 meshes with the ring gear to transmit power of the starter motor 91 to the ring gear, thereby rotating and driving the crankshaft 15.

The cylinder head 12 includes two intake ports 16 and two exhaust ports 17 for each cylinder 11a. Both the intake ports 16 and the exhaust ports 17 communicate with the corresponding one of the combustion chambers 14a. Each intake port 16 is provided with an intake valve 21 for opening and closing an opening at the combustion chamber 14a. Similarly, each exhaust port 17 is provided with an exhaust valve 22 for opening and closing an opening at the combustion chamber 14a.

An injector 18 for each cylinder 11a is attached to the cylinder head 12. The injector 18 directly injects fuel into the cylinder 11a, thereby feeding the fuel into corresponding one of the combustion chambers 14a. The fuel is fed to the injector 18 from a fuel tank 52 via a fuel feeding system 51. This fuel feeding system 51 includes a low-pressure electric fuel pump (not shown) provided inside the fuel tank 52, a fuel filter 53, a high-pressure fuel pump 54, and a common rail 55.

The high-pressure fuel pump 54 is driven by a rotating member (e.g. a camshaft) of the engine 1. This high-pressure fuel pump 54 pumps low-pressure fuel, which has been fed from the fuel tank 52 via the low-pressure fuel pump and the fuel filter 53, to the common rail 55 at a high pressure. The common rail 55 stores the pumped fuel at a high pressure. The fuel stored in the common rail 55 is injected from the injector 18 into the combustion chamber 14a by operation of the injector 18.

Note that the excessive fuel generated in the low-pressure fuel pump, the high-pressure fuel pump 54, and the common rail 55, and the injector 18 returns via a return passage 56 (directly in the case of the excessive fuel generated in the low-pressure fuel pump) to the fuel tank 52. The configuration of the fuel feeding system 51 is not limited thereto.

The cylinder head 12 includes a glow plug 19 for each cylinder 11a. The glow plug 19 warms gas which has been sucked into the cylinder 11a at cold start of the engine 1 to improve fuel ignitionability.

An intake passage 30 is connected to one side surface of the engine 1. The gas to be introduced into the combustion chambers 14a flows through the intake passage 30. On the other hand, an exhaust passage 40 is connected to the other side surface of the engine 1. The exhaust gas discharged from the combustion chambers 14a flows through the exhaust passage 40. The intake and exhaust passages 30 and 40 are provided with a turbo supercharger 61 that supercharges gas.

Specifically, the intake passage 30 communicates with the intake ports 16 of each cylinder 11a. An air cleaner 31 filtering fresh air is provided at the upstream end of the intake passage 30. A surge tank 34 is provided near the downstream end of the intake passage 30. Although not shown in detail, a portion of the intake passage 30 downstream of the surge tank 34 serves as independent passages, each branches off to one of the cylinders 11a. Each of the independent passages has a downstream end connected to the intake ports 16 of the corresponding one of the cylinders 11a.

In the intake passage 30 between the air cleaner 31 and the surge tank 34, a compressor 61a of the turbo supercharger 61, an intake shutter valve 36, and an intercooler 35 are arranged sequentially from the upstream side. The intercooler 35 cools the gas compressed by the compressor 61a. The intake shutter valve 36 is basically fully open. The intercooler 35 is configured to cool the gas using cooling water fed by an electric water pump 37.

On the other hand, the exhaust passage 40 communicates with the exhaust ports 17 of each cylinder 11a. Specifically, although not shown in detail, an upstream portion of the exhaust passage 40 serves as independent passages, each branches off to one of the cylinders 11a. Each of the independent passages has an upstream end connected to the exhaust ports 17 of the corresponding one of the cylinders 11a. A portion of the exhaust passage 40 downstream of the independent passages serves as a collector, into which the independent passages converge.

In portions of the exhaust passage 40 downstream of the collector, a turbine 61b of the turbo supercharger 61, an exhaust gas purifier 41, and a silencer 42 are disposed sequentially from the upstream side. The exhaust gas purifier 41 purifies harmful components in the exhaust gas of the engine 1. The exhaust gas purifier 41 includes an oxidation catalyst 41a and a diesel particulate filter (hereinafter referred to as a "DPF") 41b sequentially from the upstream side.

The oxidation catalyst 41a includes an oxidation catalyst which supports platinum, a mixture of platinum and palladium, or any other component, and promotes reactions in which CO and HC in the exhaust gas are oxidized to generate $CO_2$ and $H_2O$. On the other hand, the DPF 41b traps and collects fine particles such as soot contained in the exhaust gas of the engine 1. The DPF 41b may be coated with an oxidation catalyst.

The turbo supercharger 61 includes, as described above, the compressor 61a disposed in the intake passage 30, and the turbine 61b disposed in the exhaust passage 40. The turbine 61b is rotated by the flow of the exhaust gas. The compressor 61a is coupled to the turbine 61b, and operates in accordance with the rotation of the turbine 61b. Once the compressor 61a operates, the turbo supercharger 61 compresses the gas to be introduced into the combustion chambers 14a. A VGT throttle valve 62 is provided near the upstream side of the turbine 61b in the exhaust passage 40. The opening degree (i.e. throttling) of the VGT throttle valve 62 is controlled to adjust the flow speed of the exhaust gas to be transmitted to the turbine 61b.

The engine 1 causes part of the exhaust gas to flow back to the intake passage 30 from the exhaust passage 40. To realize the backflow of the exhaust gas, a high-pressure EGR passage 71 and a low-pressure EGR passage 81 are provided.

The high-pressure EGR passage 71 connects a portion of the exhaust passage 40 between the collector and the turbine 61b of the turbo supercharger 61 (i.e., a portion upstream of the turbine 61b of the turbo supercharger 61) to a portion of the intake passage 30 between the surge tank 34 and the intercooler 35 (i.e., a portion downstream of the compressor 61a of the turbo supercharger 61). In the high-pressure EGR passage 71, a high-pressure EGR valve 73 is disposed, which adjusts the backflow rate of the exhaust gas through the high-pressure EGR passage 71.

The low-pressure EGR passage 81 connects a portion of the exhaust passage 40 between the exhaust gas purifier 41 and the silencer 42 (i.e., a portion downstream of the turbine 61b of the turbo supercharger 61) to a portion of the intake passage 30 between the compressor 61a of the turbo supercharger 61 and the air cleaner 31 (i.e., a portion upstream of the compressor 61a of the turbo supercharger 61). In the low-pressure EGR passage 81, a low-pressure EGR cooler 82 and a low-pressure EGR valve 83 are disposed. The low-pressure EGR cooler 82 cools the exhaust gas passing through the low-pressure EGR passage 81. The low-pressure EGR valve 83 adjusts the backflow rate of the exhaust gas through the low-pressure EGR passage 81.

The compression ignition engine includes a powertrain control module (PCM) 100 shown in FIG. 3 to control the entire powertrain PT including the engine 1. The PCM 100 is a controller including a known microcomputer as a base element. The PCM 100 also includes a central processing unit (CPU), a memory such as a random access memory (RAM) and a read only memory (ROM), and an input and output (I/O) bus. The CPU executes programs. The memory stores programs and data. The I/O bus inputs and outputs electrical signals. The PCM 100 is a mere example of a "controller."

As shown in FIGS. 2 and 3, various types of sensors SW1 to SW11 are connected to the PCM 100. The sensors SW1 to SW11 output respective detection signals to the PCM 100. The sensors SW1 to SW11 include the following sensors.

Specifically, an airflow sensor SW2 is located downstream of the air cleaner 31 in the intake passage 30, and detects the flow rate of fresh air (or air) flowing through the intake passage 30. An intake air temperature sensor SW3 detects the temperature of the fresh air. An intake air pressure sensor SW5 is located downstream of the intercooler 35, and detects the pressure of the gas which has passed through the intercooler 35. An intake gas temperature sensor SW4 is attached to the surge tank 34, and detects the temperature of the gas to be fed into the cylinders 11a. A water temperature sensor SW8 is attached to the engine 1, and detects the temperature of engine cooling water (hereinafter referred to as a "cooling water temperature"). A crank angle sensor SW1 detects the rotation angle of the crankshaft 15. An exhaust gas pressure sensor SW6 is provided near a connecting portion of the exhaust passage 40 with the high-pressure EGR passage 71, and detects the pressure of the exhaust gas exhausted from the combustion chambers 14a. A DPF differential pressure sensor SW11 detects the differential pressure of the exhaust gas before and after passing through the DPF 41b. An exhaust gas temperature sensor SW7 detects the temperature of the exhaust gas after passing through the DPF 41b. An accelerator position sensor SW9 detects the accelerator position corresponding to the amount of depression of the accelerator pedal. A vehicle speed sensor SW10 detects the rotation speed of the output shaft of the transmission 2. The crank angle sensor SW1 used herein is an example of an "engine speed sensor."

The PCM 100 determines the operating state of the engine 1 and the traveling state of the vehicle V based on detection signals of these sensors, and calculates control variables of each actuator according to the operating state of the engine 1 and the traveling state of the vehicle V. The PCM 100 outputs the control signals associated with the obtained control variables, for example, to the injector 18, the intake shutter valve 36, the electric water pump 37, an exhaust shutter valve 43, the high-pressure fuel pump 54, the VGT throttle valve 62, the high-pressure EGR valve 73, the low-pressure EGR valve 83, and the starter motor 91.

Figure 5:
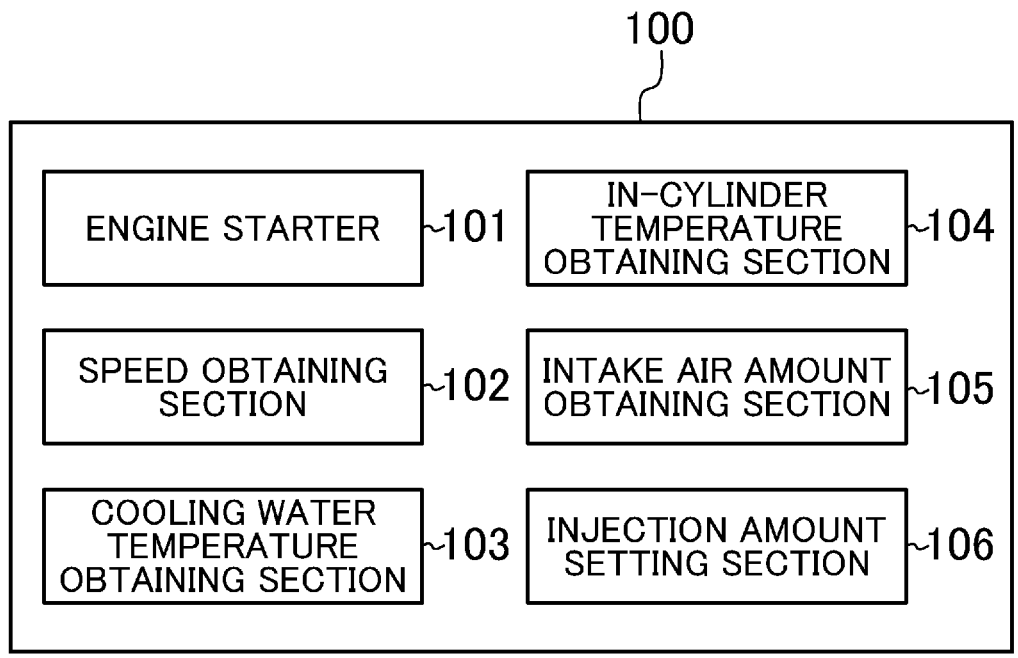
FIG. 5 is a diagram illustrating a configuration of a PCM.

Among the functions of this PCM 100, the start control functions for the engine 1 will be particularly described below in detail. FIG. 5 is a diagram illustrating a configuration of the PCM 100.

As shown in FIG. 5, the PCM 100 includes the following as functional elements associated with the start control of the engine 1. An engine starter 101 starts cranking using the starter motor 91. A speed obtaining section 102 obtains the engine speed. A cooling water temperature obtaining section 103 obtains the temperature of the engine cooling water. An in-cylinder temperature obtaining section 104 obtains the temperature inside the combustion chambers 14a (hereinafter referred to as an "in-cylinder temperature") based on the water temperature. An intake air amount obtaining section 105 obtains the amount of intake air to be introduced into the combustion chambers 14a. An injection amount setting section 106 sets the fuel injection amount injected by the injectors 18 based on the engine speed, the in-cylinder temperature, and the amount of intake air.

When the engine 1 starts, the engine starter 101 inputs a control signal to the starter motor 91. Once the control signal is input from the engine starter 101, the starter motor 91 rotates and drives the crankshaft 15. This rotation starts cranking of the engine 1.

The speed obtaining section 102 detects or estimates the engine speed based on the detection signal of the crank angle sensor SW1, and outputs a signal corresponding to the detected or estimated value to the injection amount setting section 106.

Specifically, when the starter motor 91 performs cranking, the speed obtaining section 102 detects or estimates the engine speed at a predetermined timing. In the idle operation of the engine 1 and the normal operation of the engine 1 (while the vehicle V travels), the speed obtaining section 102 obtains, prior to fuel injection in the (n+1)-th combustion cycle, an engine speed which can be achieved by combustion in a cycle before the (n+1)-th combustion cycle (i.e., combustion at or prior to an n-th cycle), where n is a positive integer, for example. The speed obtaining section 102 also generates a signal corresponding to the obtained engine speed, and outputs the signal to the injection amount setting section 106.

Note that the number of the "combustion cycles" used herein is not counted up independently for each cylinder, but is counted up for all the four cylinders together. Specifically, in a 4-cylinder engine, the combustion cycles are offset by 180 degrees. Thus, in view of the fact that one cycle ends in each cylinder 11a every time the crankshaft 15 turns 720 degrees, the number of the cycles is incremented by one every time the crankshaft 15 turns 180 degrees.

Figure 6:
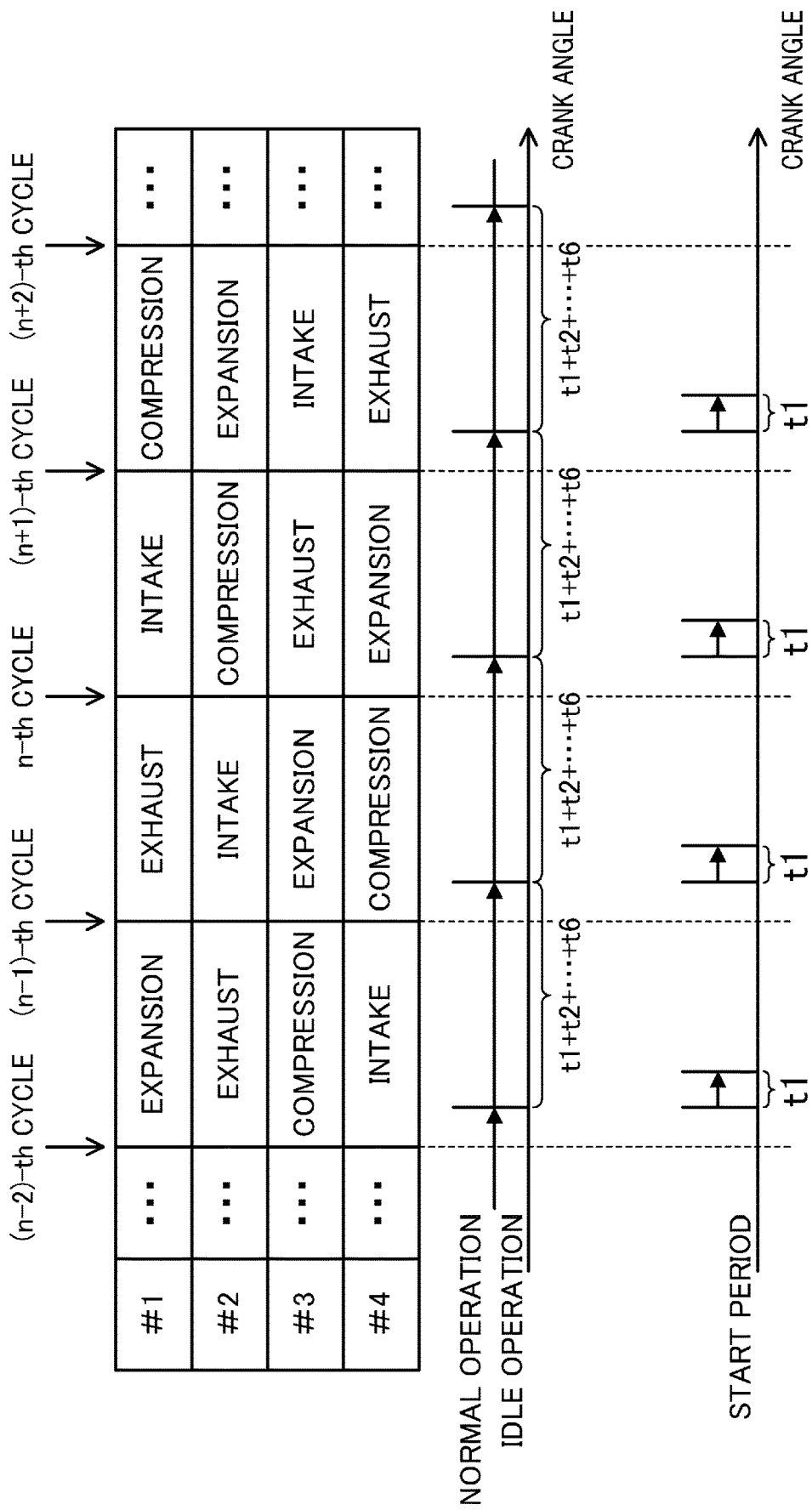
FIG. 6 is a diagram for explaining a method of obtaining an engine speed.
Figure 7:
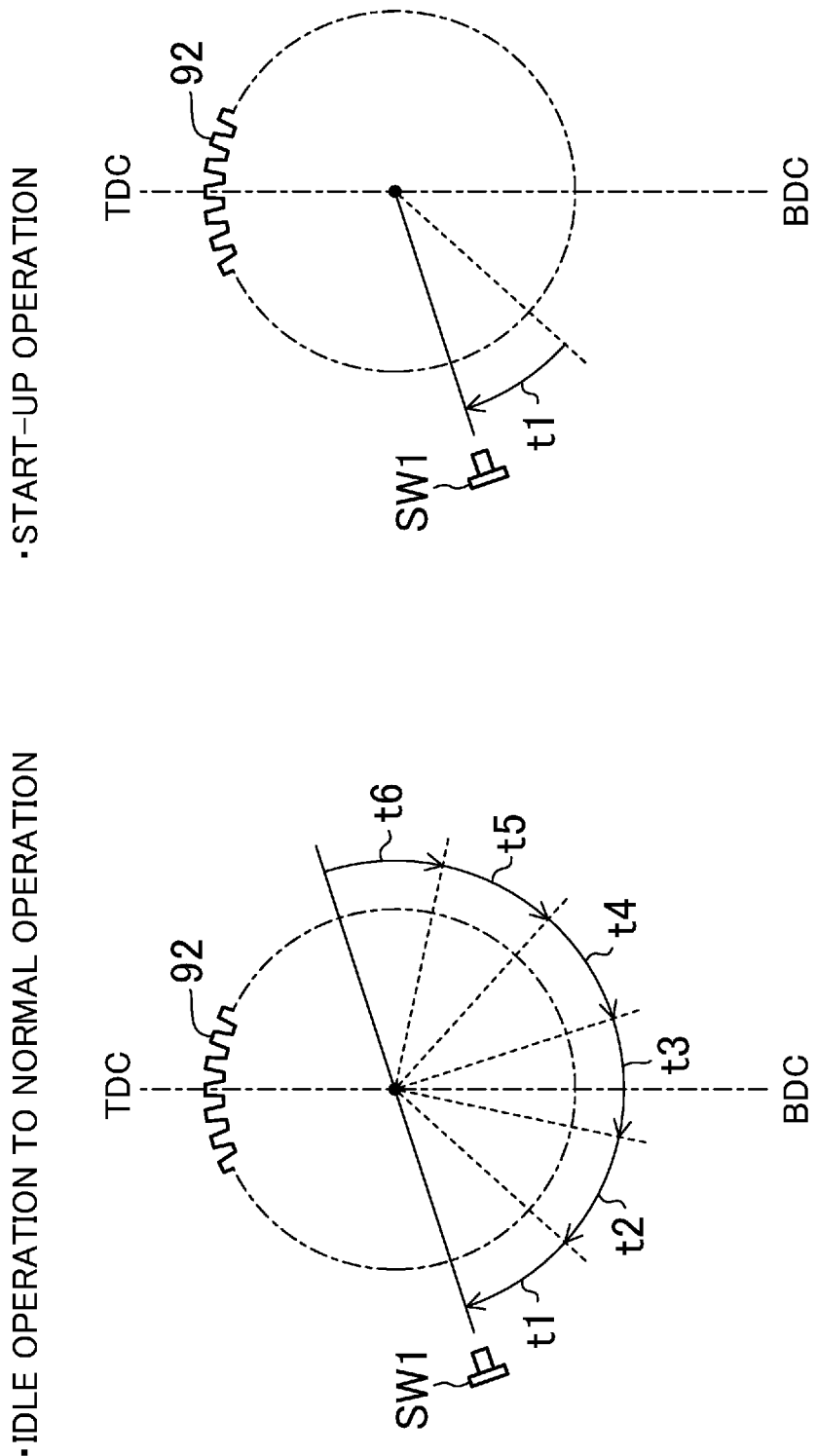
FIG. 7 is a diagram for explaining the method of obtaining the engine speed.

FIGS. 6 and 7 are diagrams for explaining a method of obtaining the engine speed. The four cylinders 11a shown in FIG. 6 may be hereinafter referred to as a first cylinder (#1), a second cylinder (#2), a third cylinder (#3), and a fourth cylinder (#4) arranged sequentially along the cylinder bank. That is, in the engine 1, combustion occurs sequentially in the #1, #3, #4, and #2 every time the crankshaft 15 turns 720 degrees. As shown in FIG. 6, the number of the combustion cycles is incremented by one every time a series of strokes, namely, intake, compression, expansion, and exhaust strokes, is performed in one of the cylinders 11a.

As shown in FIG. 7, the speed obtaining section 102 obtains, in the idle and normal operations, the engine speed based on the times (t1+t2+t3+t4+t5+t6 shown in FIGS. 6 and 7) required by the trigger plate 92 to turn 180 degrees in one of the cylinders 11a (e.g., the fourth cylinder (#4)) which is to perform combustion in the n-th combustion cycle, from the first half of the intake stroke through the intake bottom dead center to the first half of the compression stroke. As shown in FIG. 7, ti, where i is an integer from 1 to 6, represents time required by the trigger plate 92 to turn 30 degrees (hereinafter referred to as a "unit of rotation time").

In the example of FIGS. 6 and 7, the speed obtaining section 102 calculates the average of six units (t1+t2+ . . . +t6) of rotation time, obtains the rotation speed of the trigger plate 92 (i.e., the crankshaft 15) based on the average, and obtains the engine speed based on the rotation speed of the trigger plate 92. In the normal operation, the trigger plate 92 rotates at a higher speed than in the start of the engine. Thus, the engine speed can be detected more accurately by taking into account the units of rotation time in the intake stroke, and reflecting the influence of variations in the engine speed due to combustion of each combustion cycle, than in the case where only the units of rotation time in each compression stroke are taken into account. This method of obtaining the engine speed is advantageous in securing high accuracy in detecting the engine speed in the normal operation.

However, at the start of the engine 1, variations in the engine speed due to combustion of each combustion cycle are relatively large, compared to the time when the engine 1 operates at a speed higher than the idle speed, because there is a great influence of the inertia of the flywheel. Thus, if the length of time required for a half rotation of the trigger plate 92 (i.e., six units of rotation time) is used to obtain the engine speed, the accuracy in detecting the engine speed rather deteriorates. For this reason, the above-described method of obtaining the engine speed in the normal operation is not suitable as a method of obtaining the engine speed achieved by the combustion in the previous (n−1)-th combustion cycle, before the setting of the fuel injection amount in the n-th combustion cycle at the start of the engine.

To address this problem, the speed obtaining section 102 obtains the engine speed based on the unit (t1 in FIGS. 6 and 7) of rotation time in the first half of the compression stroke, in a period after the engine 1 starts combustion cycles until the engine speed reaches a predetermined idle speed (hereinafter referred to as a "start period"). As shown in FIG. 6, the first half of the compression stroke is the timing immediately before the start of fuel injection, and when the speed variations caused by the previous combustion converge.

In the engine 1, when combustion is performed in the (n−1)-th combustion cycle, that is, when the cylinder 11a executing this combustion cycle is in an expansion stroke, the cylinder 11a executing the n-th combustion cycle is in a compression stroke. Thus, the engine speed achievable by the combustion in the (n−1)-th combustion cycle can be obtained by detecting the rotation speed of the crankshaft 15 when the cylinder 11a executing the n-th combustion cycle is in the compression stroke. In particular, by obtaining the engine speed in the first half of the compression stroke, the information of the engine speed achieved by the combustion in the (n−1)-th combustion cycle can be reflected in the setting of the torque in the n-th combustion cycle, and further in a control operation of the manipulation according to the torque.

In this manner, the speed obtaining section 102 obtains, before performing fuel injection in the n-th combustion cycle, the engine speed (hereinafter may be referred to as a "present engine speed") achieved by the combustion in the previous (n−1)-th combustion cycle. Then, the speed obtaining section 102 generates a signal corresponding to the present engine speed, and outputs the signal to the injection amount setting section 106.

The cooling water temperature obtaining section 103 detects the temperature of the engine cooling water based on the detection signal of the water temperature sensor SW8, and outputs a signal corresponding to the detected value to the in-cylinder temperature obtaining section 104.

The in-cylinder temperature obtaining section 104 detects or estimates the in-cylinder temperature based on the value detected by the cooling water temperature obtaining section 103, and outputs a signal corresponding to the detected or estimated value to the injection amount setting section 106.

The intake air amount obtaining section 105 detects or estimates the amount of intake air to be introduced into the combustion chambers 14a of the cylinders 11a based on the detection signal of the airflow sensor SW2 and the detection signal of the intake air temperature sensor SW3, and outputs a signal corresponding to the detected or estimated value to the fuel amount setting section 106.

The injection amount setting section 106 sets, within the start period described above, the amount of fuel injected by the injectors 18 in the next and subsequent combustion cycles based on the engine speed detected or estimated by the speed obtaining section 102, the in-cylinder temperature detected or estimated by the in-cylinder temperature obtaining section 104, the amount of intake air detected or estimated by the intake air amount obtaining section 105. In the engine 1, the torque varies depending on the amount of injected fuel. The more fuel is injected, the larger torque of the engine 1 is obtained, while the less fuel is injected, the smaller torque of the engine 1 is obtained.

As described above, the resonance speed Rr causing resonance in the powertrain PT is lower than the idle speed Ri. Thus, within the start period, the engine speed at combustion in each combustion cycle may fall at and around the resonance speed Rr causing resonance in the powertrain PT. In this case, there is a fear that the vibrations of the entire powertrain PT including the engine 1 may be excited and increased by the resonance.

To address this problem, the present inventors found the following torque control which prevents the engine speed at combustion in each combustion cycle from falling at and around the resonance speed Rr through the processing of the injection amount setting section 106, and which, even if the engine speed falls within the range around the resonance speed Rr, can reduce vibrations associated with the resonance as soon as possible.

The PCM 100 stores a resonance speed range Br which includes the resonance speed Rr and a resonance speed range around the resonance speed Rr, as an index for determining whether the engine speed falls at and around the resonance speed Rr or not. The lower limit R1 and the upper limit R2 of this resonance speed range Br are set in advance as thresholds so that the acceleration caused when the engine 1 vibrates, and eventually when the powertrain PT vibrates, falls within a predetermined range. The lower limit R1 is higher than a cranking determination value Rc. On the other hand, the upper limit R2 is lower than the idle speed Ri.

(Control Associated with Fuel Injection)

Figure 4:
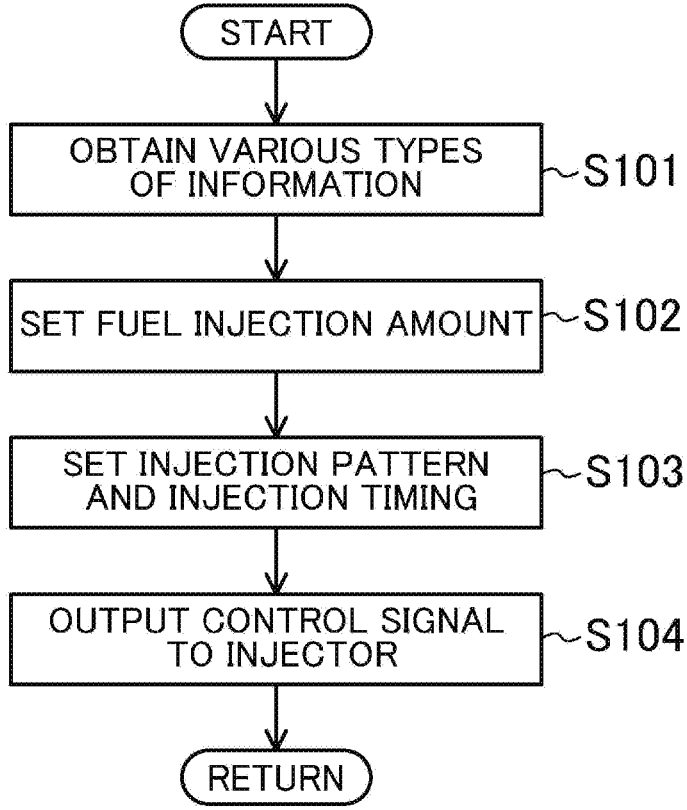
FIG. 4 is a flowchart illustrating a process of controlling an injector.

FIG. 4 illustrates a control process associated with fuel injection. The PCM 100 executes fuel injection using the injectors 18 in the process shown in FIG. 4 including the execution of the injection amount setting section 106.

Once the process shown in FIG. 4 starts, the PCM 100 first obtains various types of information in step S101, based on the detection signals obtained from the sensors. For example, the PCM 100 obtains the engine speed, the accelerator position, the temperature of cooling water, and the amount of intake air. Then, in step S102, the injection amount setting section 106 of the PCM 100 sets a target amount of fuel to be injected into the combustion chambers 14a (hereinafter referred to as a "fuel injection amount") based on the information obtained in step S101. Furthermore, in step S103, the PCM 100 sets the injection pattern and injection timing at the execution of fuel injection. After that, in step S104, the PCM 100 generates control signals corresponding to the settings in steps S102 to S103, and inputs to the injectors 18.

In such a control process associated with fuel injection, step S101 is an example of a "step of obtaining an engine speed." Step S102 is an example of a "step of setting an amount of fuel" and a "step of setting a torque." In the engine 1, the torque is adjusted depending on the fuel injection amount described above. The more fuel is injected, the larger torque is obtained, while the less fuel is injected, the smaller torque is obtained. Setting the fuel injection amount is equivalent to setting the torque of the engine 1.

(Process of Setting Fuel Injection Amount)

Figure 8:
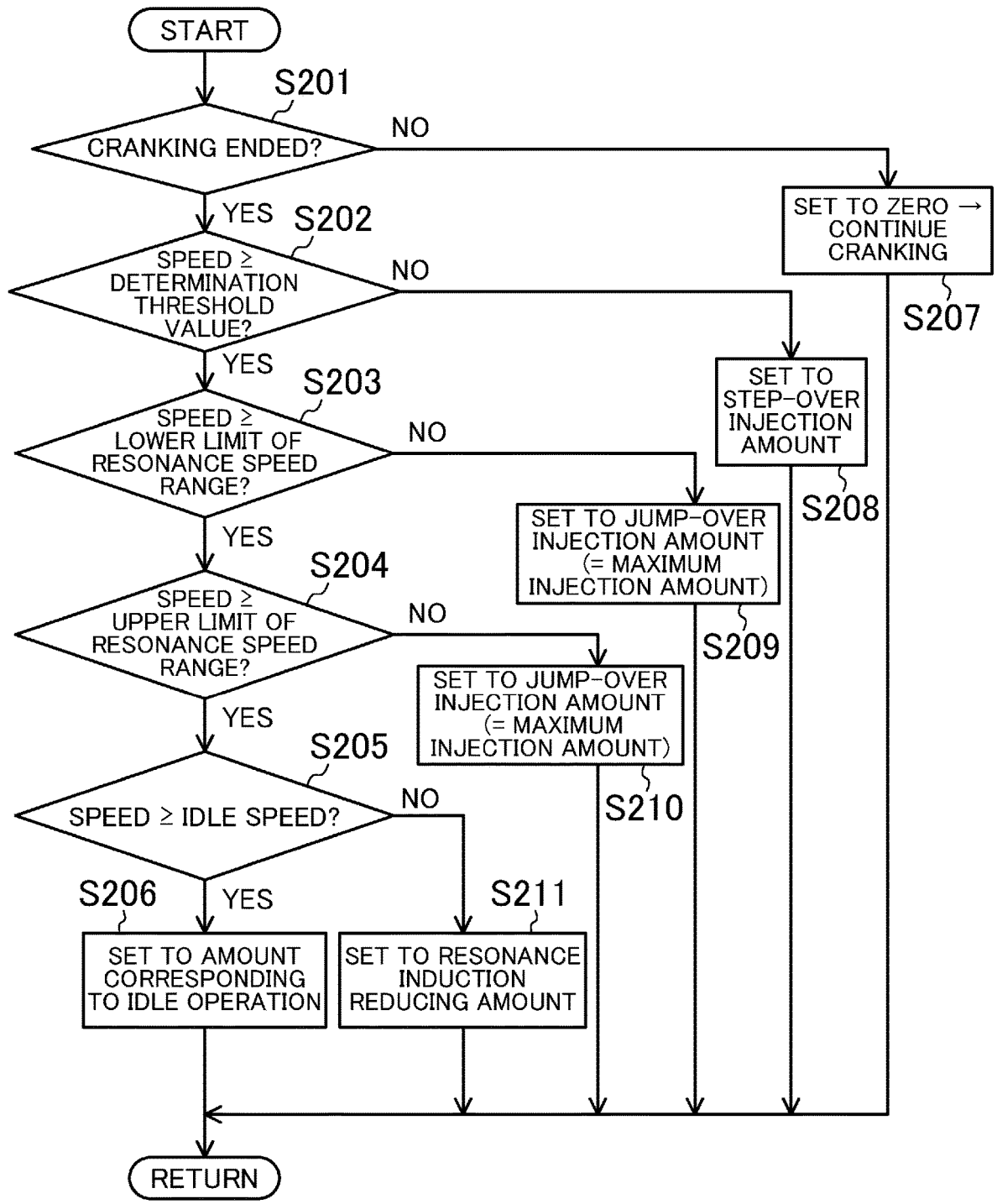
FIG. 8 is a flowchart illustrating a process of setting the fuel injection amount.

Of the start control of the engine 1, a process of setting the fuel injection amount will be particularly described in detail below with reference to FIG. 8. FIG. 8 is a flowchart illustrating the process of setting the fuel injection amount. The process shown in FIG. 8 is an example of processing according to step S102 of FIG. 6.

In the process shown in FIG. 8, the injection amount setting section 106 sets the fuel injection amount to be smaller than or equal to a predetermined maximum injection amount Fm. The maximum injection amount Fm decreases when the in-cylinder temperature is high, and increases when the in-cylinder temperature is low. The maximum injection amount Fm is set so that the engine outputs the maximum torque corresponding to the in-cylinder temperature and the amount of intake air. The maximum injection amount Fm increases when a larger amount of intake air is introduced, and decreases when a smaller amount of intake air is introduced.

Once the process shown in FIG. 8 starts, the injection amount setting section 106 first obtains the engine speed and determines whether or not cranking has ended in step S201. This determination is made based on whether or not the engine speed is higher than or equal to the cranking determination value Rc illustrated in FIGS. 9 and 10. The cranking determination value Rc is set in advance in accordance with, for example, the configuration of the engine 1.

In this step S201, if the engine speed is lower than the cranking determination value Rc, the section determines that the cranking has not ended and concludes NO. If the determination is NO, the process proceeds to step S207. In step S207, the injection amount setting section 106 sets the fuel injection amount to zero, and continues cranking. On the other hand, in step S201, if the engine speed reaches at or higher than a cranking turnover value Rc, the section determines that the cranking has ended, and concludes YES. If the determination is YES, the process proceeds from step S201 to step S202 so that cranking shifts to combustion cycles ("firing").

In step S202, the injection amount setting section 106 determines whether or not the difference between the lower limit R1 of the resonance speed range Br and the engine speed is lower than a predetermined reference value. Specifically, the present embodiment employs a method of determining whether or not the engine speed is higher than or equal to a predetermined determination threshold value R0. The determination threshold value R0 is set in advance to a value smaller than the lower limit R1 of the resonance speed range Br by the predetermined reference value. The determination threshold value R0 is greater than the cranking determination value Rc, and smaller than the lower limit R1 of the resonance speed range Br.

In step S202, the process proceeds to step S208 if the engine speed is lower than the predetermined determination threshold value R0 (i.e., if the difference between the lower limit R1 of the resonance speed range Br and the engine speed is smaller than the reference value) and the determination is NO. In step S208, the injection amount setting section 106 sets the fuel injection amount to a predetermined step-over injection amount F1, and the process goes to Return.

The step-over injection amount F1 is set such that when the fuel injection with the step-over injection amount F1 is performed, the engine speed achieved by the combustion associated with the fuel injection is higher than or equal to the determination threshold value R0 and lower than the lower limit R1 of the resonance speed range Br. The step-over injection amount F1 is smaller than the maximum injection amount Fm described above (i.e., step-over injection amount<maximum injection amount). The step-over injection amount F1 is an example of the "second injection amount" for obtaining a "second torque."

On the other hand, in step S202, if the engine speed is higher than or equal to the predetermined determination threshold value R0 (i.e., the difference between the lower limit R1 of the resonance speed range Br and the engine speed is larger than or equal to the reference value), and the determination is YES, the process proceeds to step S203. In step S203, the injection amount setting section 106 determines whether or not the engine speed is higher than or equal to the lower limit R1 of the resonance speed range Br.

In step S203, the process proceeds to step S209 if the engine speed is lower than the lower limit R1 of the resonance speed range Br and the determination is NO. In step S209, the injection amount setting section 106 sets the fuel injection amount to a predetermined jump-over injection amount F2, and the process goes to Return. On the other hand, in step S203, if the engine speed is higher than or equal to the lower limit R1 of the resonance speed range Br and the determination is YES, the process proceeds to step S204.

The jump-over injection amount F2 set in step S209 as the fuel injection amount is equal to the maximum injection amount Fm described above (i.e., jump-over injection amount=maximum injection amount). Thus, the jump-over injection amount F2 is larger than the step-over injection amount F1 described above (jump-over injection amount>step-over injection amount). The jump-over injection amount F2 is set such that the engine speed increases at a maximum rate by the combustion in the combustion cycles in the start period from the start of combustion cycles until the engine speed reaches the idle speed.

If the fuel injection amount is set to the jump-over injection amount F2, the engine speed is increased more by an increased amount of the fuel injected, than in the case, for example, where the fuel injection amount is set to the step-over injection amount F1. This is advantageous in increasing the engine speed, by the combustion in one cycle, from a value smaller than the lower limit R1 of the resonance speed range Br to a value greater than the upper limit R2 (hereinafter referred to as "jumping over the resonance speed range Br"). The jump-over injection amount F2 is an example of the "first injection amount" for obtaining a "first torque."

Even if the maximum injection amount Fm is set as the jump-over injection amount F2 as in step S203, the engine speed does not always jump over the resonance speed range Br successfully. For example, the maximum injection amount Fm increases and decreases in accordance with the in-cylinder temperature. Furthermore, in-cylinder oxygen concentration varies due to changes in the air density which varies according to changes in the intake air temperature. The obtainable torque therefore changes even if the same amount of fuel is injected. In addition, the resonance speed range Br may change in accordance with the external environment. Specifically, elastic properties of the engine mount 204 change with a decrease in the outside air temperature. As a result, the acceleration at the time when the powertrain PT vibrates changes, and hence the lower limit R1 and the upper limit R2 of the resonance speed range Br also change. Because of such circumstances, the engine speed at combustion in each combustion cycle may fall within the resonance speed range Br.

To address this problem, when the engine speed falls within the resonance speed range Br, the injection amount setting section 106 according to this embodiment executes, in steps S204 and S210, processing for immediately reducing vibrations caused by such engine speed.

In step S204, the section determines whether or not the engine speed is higher than or equal to the upper limit R2 of the resonance speed range Br. In step S204, the process proceeds to step S210 if the engine speed is lower than the upper limit R2 of the resonance speed range Br and the determination is NO. In step S210, the injection amount setting section 106 sets the fuel injection amount to the predetermined jump-over injection amount F2, and the process goes to Return. On the other hand, in step S204, if the engine speed is higher than or equal to the upper limit R2 of the resonance speed range Br and the determination is YES, the process proceeds to step S205.

In step S210, if the fuel injection amount is set to the jump-over injection amount F2, the engine speed increases significantly as in the processing in step S209 described above. This is advantages in increasing the engine speed from a value within the resonance speed range Br to a value greater than or equal to the upper limit R2 of the resonance speed range Br (hereinafter referred to as "getting out of the resonance speed range Br").

Note that, in step S204, the jump-over injection amount F2 that is set as the fuel injection amount is not necessarily equal to the maximum injection amount Fm. The jump-over injection amount F2 may be at least larger than the fuel injection amount that is set when the engine speed is higher than or equal to the upper limit R2 of the resonance speed range Br. Specifically, the jump-over injection amount F2 may be larger than the fuel injection amount that is set for the combustion cycle subsequent to the combustion cycle in which the engine speed has successfully jumped over the resonance speed range Br, or larger than the fuel injection amount that is set for the combustion cycle subsequent to the combustion cycle in which the engine speed has gotten out of the resonance speed range Br.

Even if the engine speed successfully jumps over or gets out of the resonance speed range Br, torque variations may induce resonance immediately after the engine speed has passed through the resonance speed range Br.

To address this problem, when the engine speed successfully jumps over or gets out of the resonance speed range Br, the injection amount setting section 106 according to this embodiment executes, in steps S205 and S211, processing of reducing the induction of resonance after the engine speed have passed through the resonance speed range Br.

In step S205, the injection amount setting section 106 determines whether or not the engine speed is higher than or equal to the idle speed Ri. In step S205, if the engine speed is lower than the idle speed Ri, and the determination is NO, that is, the engine speed successfully jumps over or gets out of the resonance speed range Br but fails to reach the idle operating state, the process proceeds to step S211. On the other hand, in step S205, if the engine speed is higher than or equal to the idle speed Ri, and the determination is YES, the process proceeds to step S206. In step S206, the injection amount setting section 106 sets the fuel injection amount to an amount Fi corresponding to the idle operation, and the process goes to Return, thereby starting the idle operation.

In step S211, the injection amount setting section 106 sets the fuel injection amount in the subsequent combustion cycle to a predetermined resonance induction reducing amount F3, and the process goes to Return. The resonance induction reducing amount F3 is at least smaller than the jump-over injection amount F2 that is set so as to jump over the resonance speed range Br (i.e., resonance induction reducing amount<jump-over injection amount). This is advantages in reducing induction of the resonance, since the torque variations decrease by an amount of decrease in the resonance induction reducing amount F3.

The injection amount setting section 106 calculates the difference ΔR between the engine speed achieved in the combustion cycles at a time subsequent to when the engine speed has passed through the resonance speed range Br (specifically, in the combustion cycles at a time subsequent to when the engine speed has jumped over or gotten out of the resonance speed range Br) and the upper limit R2 of the resonance speed range Br. The section also sets the resonance induction reducing amount F3 to be smaller if the difference ΔR is small, than if the difference ΔR is large.

That is, the resonance induction reducing amount F3 is set not only in the combustion cycle immediately after the engine speed has jumped over or gotten out of the resonance speed range Br, but also until the engine speed reaches the idle operating state.

Figure 11:
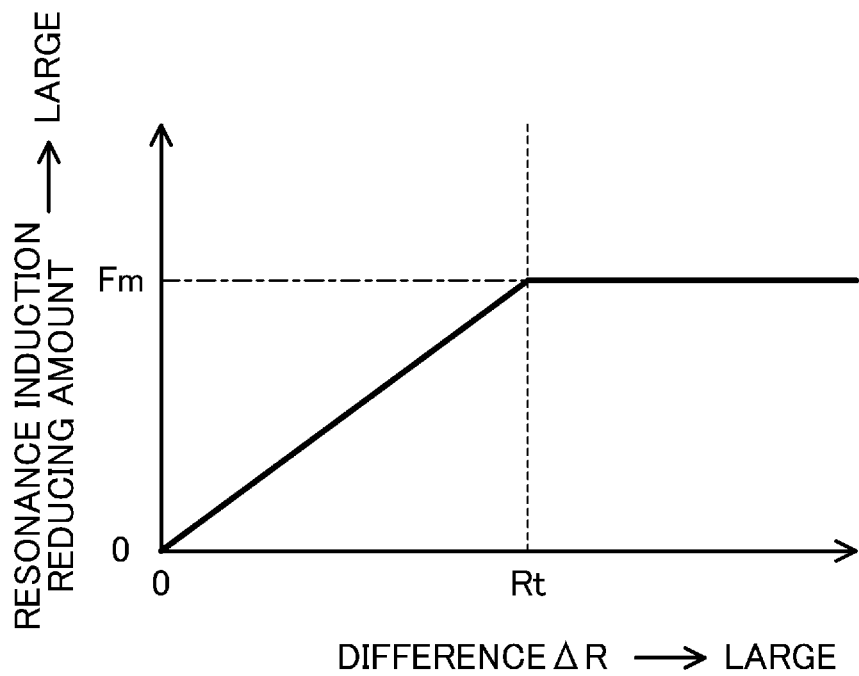
FIG. 11 is a diagram illustrating changes in the fuel injection amount according to the difference between the engine speed and an upper limit of a resonance speed range.

FIG. 11 illustrates the fuel injection amount (i.e., the resonance induction reducing amount F3) at a time subsequent to when the engine speed has passed through the resonance speed range Br. As shown in FIG. 11, when the difference ΔR increases from zero to a predetermined resonance induction determination value Rt, the resonance induction reducing amount F3 increases with an increase in the difference ΔR, and reaches the maximum injection amount Fm. As the resonance induction reducing amount F3 increases, the torque generated by the combustion based on the resonance induction reducing amount F3 also increases along the straight line L of FIG. 11. The straight line L is defined based on the vibration characteristics of the powertrain PT. It is defined that acceleration caused by the vibrations of the powertrain PT exceeds a tolerance range when the torque generated by the operation of the engine 1 exceeds the straight line L. Setting the fuel injection amount in accordance with the characteristics shown in FIG. 11 causes the engine 1 to output torque having a value along the straight line L, and thus allows the acceleration to fall within the tolerance range.

On the other hand, if the difference ΔR is larger than the resonance induction determination value Rt, the resonance induction reducing amount F3 is constant at the maximum injection amount Fm.

Now, how the engine speed increases when the start of the engine 1 is controlled in accordance with the above-described process of setting the fuel injection amount, will be described below with reference to FIGS. 9 and 10 using examples.

Figure 9:
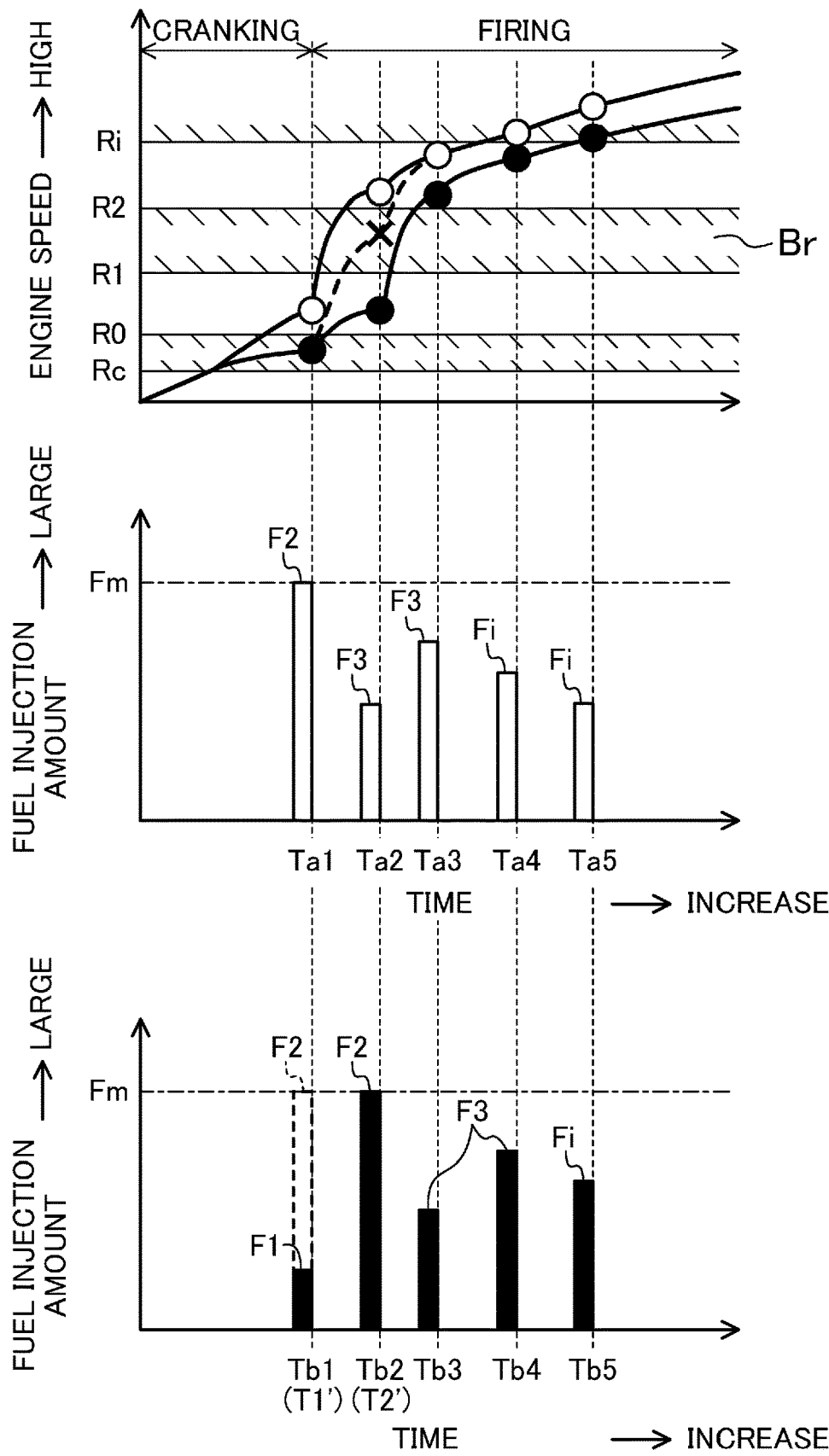
FIG. 9 is a diagram illustrating changes in the engine speed and the fuel injection amount at start of the engine.

FIG. 9 is a time chart illustrating changes in the engine speed and changes in the fuel injection amount at start of the engine 1. FIG. 10 illustrates variations in the torque with respect to the engine speed at the start of the engine 1. Ta1 to Ta5 and Tb1 to Tb6 in FIGS. 9 and 10 represent states achieved by combustion in the combustion cycles.

First, a first example will be described, in which the engine speed at the time when it is determined that cranking has ended in step S201 is higher than the determination threshold value R0. In the first example, the engine speed follows the rising path formed by connecting the white circles (o) shown in the uppermost graph in FIG. 9. As shown in the middle graph, the fuel injection amounts in the respective combustion cycles are set immediately before the combustion times Ta1 to Ta5. In FIG. 10, the relationship between the engine speed and the torque shifts from Ta1 through Ta2, Ta3, and Ta4 to Ta5 in accordance with combustion in the cycles.

Specifically, in the first example, the engine speed at the time when the cranking has ended is higher than or equal to the determination threshold value R0 and lower than the lower limit R1 of the resonance speed range Br. Thus, the fuel injection amount in the first combustion cycle is set to the jump-over injection amount F2 by the fuel amount setting section 106 (in step S209). When the set amount of fuel is injected, and the injected fuel is burnt, the engine speed is increased more significantly compared to when the cranking has ended, due to the torque obtained by the combustion. The engine speed jumps over the resonance speed range Br in this manner.

Figure 10:
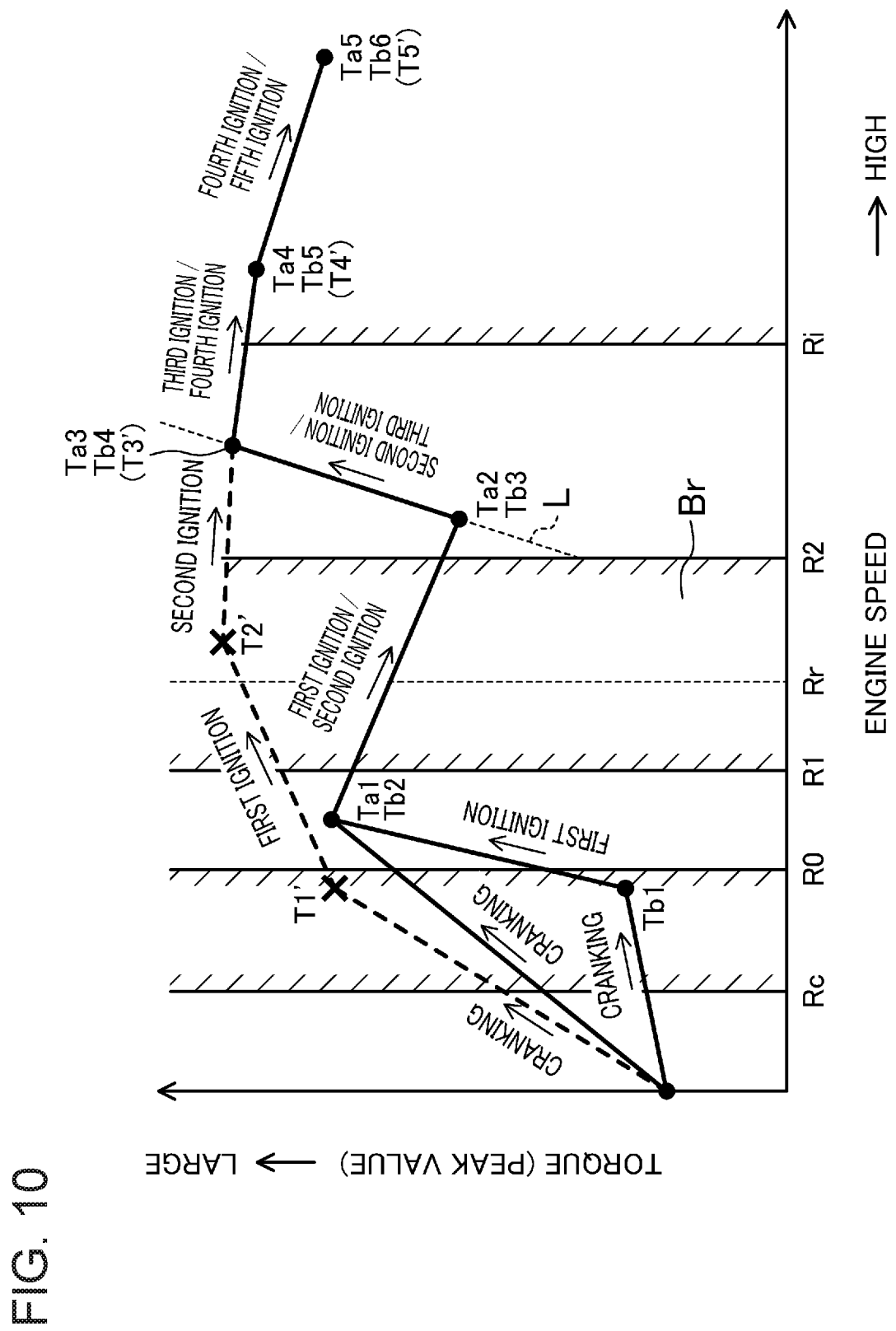
FIG. 10 is a diagram illustrating variations in a torque according to the engine speed at start of the engine.

When the engine speed jumps over the resonance speed range Br, the engine speed achieved by the combustion in the first cycle (i.e. the first ignition) increases, as indicated by the solid line connecting Ta1 and Ta2 shown in FIGS. 9 and 10, to a speed higher than the upper limit R2 of the resonance speed range Br and lower than the idle speed Ri. Thus, the fuel injection amount in the second combustion cycle is set to the resonance induction reducing amount F3, which is smaller than the jump-over injection amount F2, by the fuel amount setting section 106 (in step S211). When the set amount of fuel is injected, and the injected fuel is burnt, the engine speed is increased less significantly due to the torque obtained by the combustion, by the reduced amount of the fuel injection, compared to when the first combustion cycle is performed.

When combustion is performed in the second combustion cycle, the engine speed obtained by the combustion increases as indicated by the solid line connecting Ta2 to Ta3 shown in FIGS. 9 and 10, but is still lower than the idle speed Ri. Thus, the fuel injection amount in the third cycle is also set to the resonance induction reducing amount F3 by the fuel setting section 106 (in step S211). Since the engine speed increases to be relatively far from the resonance speed range Br, the resonance induction reducing amount in the third cycle is set to be larger than the resonance induction reducing amount F3 set in the second combustion cycle. When the set amount of fuel is injected, and the injected fuel is burnt, the engine speed is increased more significantly due to the torque obtained by the combustion, by the increased amount of the fuel injection, compared to when the second combustion cycle is performed.

When combustion is performed in the third combustion cycle, the engine speed achieved by the combustion increases as indicated by the solid line connecting Ta3 to Ta4 shown in FIGS. 9 and 10, and the engine speed becomes higher than the idle speed Ri. Thus, the fuel injection amount in the fourth combustion cycle is set to the amount Fi corresponding to the idle operation by the fuel amount setting section 106 (in step S206). When the set amount of fuel is injected and the injected fuel is burnt, the engine speed is maintained at the speed higher than or equal to the idle speed Ri, due to the torque obtained by the combustion, thereby performing the idle operation.

Now, a second example will be described, in which the engine speed at the time when the cranking has ended is lower than the determination threshold value R0. In the second example, the engine speed follows the rising path formed by connecting the black circles (●) shown in the uppermost graph in FIG. 9. As shown in the lowermost graph, the fuel injection amounts in the respective combustion cycles are set immediately before the combustion times Tb1 to Tb5. In FIG. 10, the relationship between the engine speed and the torque shifts from Tb1 through Tb2, Tb3, Tb4, and Tb5 to Tb6 in accordance with combustion in the cycles.

Specifically, in the second example, the engine speed at the time when the cranking has ended is lower than the determination threshold value R0. Thus, the fuel injection amount in the first combustion cycle is set to the step-over injection amount F1, which is smaller than the jump-over injection amount F2, by the fuel amount setting section 106 (in step S208). When the set amount of fuel is injected and the injected fuel is burnt, the engine speed increases, due to the torque obtained by the combustion, and approaches the lower limit R1 of the resonance speed range Br as indicated by the solid line connecting Tb1 and Tb2 shown in FIGS. 9 and 10.

When combustion is performed in the first combustion cycle, the engine speed achieved by the combustion increases, as indicated by the solid line connecting Tb1 and Tb2 shown in FIGS. 9 and 10, to a speed higher than the determination threshold value R0 and lower than the lower limit R1 of the resonance speed range Br. Since the engine speed has increased to be close to the lower limit R1 of the resonance speed range Br, due to the combustion in the first combustion cycle, the fuel injection amount in the second combustion cycle is set to the jump-over injection amount F2 by the fuel setting section 106 (in step S209). When the set amount of fuel is injected and the injected fuel is burnt, the engine speed is increased more significantly due to the torque obtained by the combustion, by the increased amount of the fuel injection, compared to when the first combustion cycle is performed. The engine speed jumps over the resonance speed range Br in this manner.

When the engine speed jumps over the resonance speed range Br, the engine speed achieved by the combustion in the second cycle (i.e. the second ignition) increases, as indicated by the solid line connecting Tb2 and Tb3 shown in FIGS. 9 and 10, to a speed higher than the upper limit R2 of the resonance speed range Br and lower than the idle speed Ri. The fuel injection amount and how the engine speed increases due to combustion in the third and subsequent combustion cycles according to the second example are the same as those in the second and subsequent combustion cycles according to the first example described above.

Sometimes in the case in which, as in the second example, the fuel injection amount in the first combustion cycle is set to the maximum injection amount because the engine speed at the time when cranking has ended is lower than the determination threshold value R0, the engine speed achieved by the fuel injection based on the setting and the combustion of the injected fuel may fall within the resonance speed range Br, as indicated by the broken line connecting T1' and T2' shown in FIGS. 9 and 10. If this happens, the resonance generates large vibrations in the powertrain PT including the engine 1. The vibrations of the powertrain cause vibrations and noise in the vehicle V, which makes the occupant(s) in the vehicle V uncomfortable.

To address this problem, the following settings are made in the engine 1 of the present embodiment, as described in the first and second examples. That is, the injection amount setting section 106 sets the fuel injection amount to the step-over injection amount F1 smaller than the jump-over injection amount F2, if the engine speed is lower than the determination threshold value R0. The injection amount setting section 106 sets the fuel injection amount to the jump-over injection amount F2 larger than the step-over injection amount F1, if the engine speed is higher than or equal to the determination threshold value R0. This configuration makes it possible to increase the engine speed such that the engine speed approaches the lower limit R1 of the resonance speed range Br, up to a predetermined range, and then cause the engine speed to jump over the resonance speed range Br, while in the process of increasing the engine speed by execution of the combustion cycles. This reduces possible failures in jumping over the resonance speed range Br. The resonance occurring in the powertrain PT at the start of the engine 1 can be effectively reduced in this manner. As a result, vibrations of the vehicle V caused by resonance in the powertrain PT, and accompanying noise can be advantageously reduced.

As can be seen, a preferred embodiment has been described as an example of the technique disclosed herein. However, the technique disclosed herein is not limited to the above embodiment, and is also applicable to those embodiments in which changes, replacement, addition, omission, and other modifications are made. Alternatively, components described in the above embodiment may be combined as another embodiment. In addition, some of the components illustrated in the appended drawings or mentioned in the detailed description may be unessential in solving the problem. Therefore, such unessential components should not be taken for essential ones, simply because such unessential components are illustrated in the drawings or mentioned in the detailed description.

For example, the foregoing embodiment may also have the following configurations.

The configuration of the engine 1 is a mere example, and not limited thereto. For example, while the engine 1 includes the turbo supercharger 61 in the embodiment, the turbo supercharger 61 may be omitted.

While an example has been described in which the engine 1 is a diesel engine and the fuel injection amount is adjusted to control the torque, the configuration is not limited thereto. The engine 1 may be a spark ignition gasoline engine. In this case, the torque of the engine 1 may be controlled by adjusting an ignition timing in addition to or in place of the adjustment of the fuel injection amount.

What is important is as follows. The engine speed is obtained in each combustion cycle at the start of the engine 1. If the difference between the engine speed and the lower limit R1 of the resonance speed range Br is lower than a predetermined reference value, a relatively large torque (e.g., the first torque) is set. If the difference is larger than or equal to the reference value, a relatively small torque (e.g., the second torque) is set. This setting makes it possible to increase the engine speed such that the engine speed approaches the lower limit of the resonance speed range, up to a predetermined range, and then becomes higher than or equal to the resonance speed range Br, while in the process of increasing the engine speed by executing combustion cycles.

DESCRIPTION OF REFERENCE CHARACTERS

1 Engine (Compression Ignition Engine)
11*a* Cylinder
14 Piston
14*a* Combustion Chamber
15 Crankshaft
18 Injector
91 Starter Motor
100 PCM (Controller)
101 Engine Starter
102 Speed Obtaining Section
105 Intake Air Amount Obtaining Section
106 Injection Amount Setting Section
Ri Idle Speed
Rr Resonance Speed
Br Resonance Speed Range
R0 Determination Threshold Value (Reference Value)
R1 Lower Limit of Resonance Speed Range
R2 Upper Limit of Resonance Speed Range
F1 Step-Over Injection Amount (Second Injection Amount)
F2 Jump-Over Injection Amount (First Injection Amount)
F3 Resonance Induction Reducing Amount
SW1 Crank Angle Sensor (Engine Speed Sensor)
SW2 Airflow Sensor
SW8 Water Temperature Sensor

The invention claimed is:

1. A method of controlling start of an engine from when cranking is started by driving a starter motor until when an engine speed reaches a predetermined idle speed by execution of combustion cycles, the method comprising:
   a step of obtaining the engine speed in each cycle; and
   a step of setting a torque based on the engine speed obtained in the step of obtaining the engine speed, wherein
   in the step of setting the torque,
   a first torque is set as the torque, if a difference between a lower limit of a preset resonance speed range including an engine speed corresponding to a resonance frequency of a powertrain unit including the engine and the engine speed obtained in the step of obtaining the engine speed is smaller than a predetermined reference value, and
   a second torque smaller than the first torque is set as the torque, if the difference is larger than or equal to the reference value.

2. The method of claim 1, wherein
   in the step of setting the torque, if the difference is larger than or equal to the reference value, the torque is set so that the engine speed achievable by combustion in one of the combustion cycles, the engine speed of which combustion cycle has been obtained to have the difference, is lower than the lower limit of the resonance speed range, and so that the difference becomes smaller than the reference value.

3. The method of claim 1, wherein
   the engine is a 4-cylinder, 4-cycle engine, and
   in the step of obtaining the engine speed, a rotation speed of a crankshaft provided in the engine is detected when a cylinder executing an n-th combustion cycle is in a first half of a compression stroke of the combustion cycle, where n is a positive integer, and the engine speed achieved by combustion in an (n−1)-th combustion cycle is obtained based on the rotation speed.

4. The method of claim 1, wherein
   the engine is a compression ignition engine which includes at least one injector configured to inject fuel to be fed into a combustion chamber, and which ignites the fuel fed into the combustion chamber by a compression operation of a piston,
   the step of setting the torque is a step of setting an amount of fuel to be injected by the injector in accordance with the difference, and
   in the step of setting the amount of fuel, a first predetermined injection amount is set as the amount of fuel to be injected, if the difference is smaller than the reference value, and a second injection amount, which is smaller than the first injection amount, is set as the amount of fuel to be injected, if the difference is larger than or equal to the reference value.

5. The method of claim 4, wherein
   an amount of intake air to be introduced into the combustion chamber, and a temperature inside the combustion chamber are obtained, and
   in the step of setting the amount of fuel, if the difference is smaller than the reference value, the first injection amount is set to allow the engine to output a maximum torque corresponding to the amount of intake air to be introduced to the combustion chamber and the temperature inside the combustion chamber.

6. The method of claim 4, wherein
in the step of setting the amount of fuel, if the difference is smaller than the reference value, the first injection amount is set such that the engine speed increases at a maximum rate by combustion of the combustion cycles in a start period from start of the combustion cycles until the engine speed reaches the idle speed.

7. A system for controlling start of an engine comprising:
a starter motor which rotates a crankshaft provided in the engine;
an injector attached to the engine, and configured to inject fuel to be fed into a combustion chamber;
a controller connected to each of the starter motor and the injector, and configured to output a control signal to each of the starter motor and the injector to operate the engine;
an engine speed sensor connected to the controller, and configured to detect an engine speed and output a detection signal to the controller; wherein
the controller includes:
a speed obtaining section which obtains the engine speed in each of cycles based on the detection signal of the engine speed sensor; and
a fuel amount setting section which sets, based on the engine speed obtained by the speed obtaining section, an amount of fuel to be injected by the injector, and
the fuel amount setting section sets: in a start period of the engine from when cranking is started by driving the starter motor until when the engine speed reaches a predetermined idle speed by execution of the combustion cycles,
a first injection amount as the amount of fuel to be injected, if a difference between a lower limit of a preset resonance speed range including an engine speed corresponding to a resonance frequency of a powertrain unit including the engine and the engine speed obtained by the speed obtaining section is smaller than a predetermined reference value; and
a second injection amount, which is smaller than the first injection amount, as the amount of fuel to be injected, if the difference is larger than or equal to the reference value.

8. The system of claim 7, wherein,
if the difference is larger than or equal to the reference value, the fuel amount setting section sets the second injection amount so that the engine speed achievable by combustion in one of the combustion cycles, the engine speed of which combustion cycle has been obtained to have the difference, is lower than the lower limit of the resonance speed range, and so that the difference becomes smaller than the reference value.

9. The system of claim 7, wherein,
the engine is a 4-cylinder, 4-cycle engine, and
the speed obtaining section detects a rotation speed of a crankshaft when a cylinder executing an n-th combustion cycle is in a first half of a compression stroke of the combustion cycle, and obtains the engine speed achieved by combustion in an (n−1)-th combustion cycle based on the rotation speed of the crankshaft, where n is a positive integer.

10. The system of claim 7, wherein
the engine is a compression ignition engine which ignites fuel fed into the combustion chamber by a compression operation of a piston.

11. The system of claim 10, further comprising:
an airflow sensor which detects a flow rate of intake air flowing through an intake passage provided in the engine; and
a water temperature sensor which is attached to the engine, and detects a temperature of engine cooling water, wherein
the controller obtains an amount of intake air to be introduced to the combustion chamber based on a detection signal of the airflow sensor, and obtains a temperature inside the combustion chamber based on a detection signal of the water temperature sensor, and
if the difference is smaller than the reference value, the fuel amount setting section sets the first injection amount so as to allow the engine to output a maximum torque corresponding to the amount of intake air to be introduced to the combustion chamber and the temperature inside the combustion chamber.

12. The system of claim 10, wherein,
if the difference is smaller than the reference value, the fuel amount setting section sets the first injection amount such that the engine speed increases at a maximum rate by combustion of the combustion cycles in a start period from start of the combustion cycles until the engine speed reaches the idle speed.

* * * * *